(12) United States Patent
Lee et al.

(10) Patent No.: US 12,418,709 B2
(45) Date of Patent: Sep. 16, 2025

(54) LENS ASSEMBLY AND ELECTRONIC DEVICE COMPRISING SAME

(71) Applicant: Samsung Electronics Co., Ltd., Suwon-si (KR)

(72) Inventors: Yongjae Lee, Suwon-si (KR); Kyungtae Nam, Suwon-si (KR); Valeriy Prushinskiy, Suwon-si (KR); Bonggyo Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 91 days.

(21) Appl. No.: 18/521,098

(22) Filed: Nov. 28, 2023

(65) Prior Publication Data

US 2024/0098352 A1 Mar. 21, 2024

Related U.S. Application Data

(63) Continuation of application No. PCT/KR2022/005664, filed on Apr. 20, 2022.

(30) Foreign Application Priority Data

Jun. 21, 2021 (KR) .................. 10-2021-0079881

(51) Int. Cl.
*H04N 23/20* (2023.01)
*G01S 17/89* (2020.01)
(Continued)

(52) U.S. Cl.
CPC ............. *H04N 23/55* (2023.01); *G01S 17/89* (2013.01); *H04N 23/13* (2023.01); *H04N 23/45* (2023.01); *H04N 23/56* (2023.01); *H04N 23/57* (2023.01)

(58) Field of Classification Search
CPC ............ G01S 7/4865; G02B 9/34; G02B 9/60
(Continued)

(56) References Cited

U.S. PATENT DOCUMENTS 11,500,067 B1 * 11/2022 McMichael .............. G02B 9/64
2010/0097710 A1 4/2010 Lai et al.
(Continued)

FOREIGN PATENT DOCUMENTS

JP 2013-205715 A 10/2013
JP 2014-044399 A 3/2014
(Continued)

OTHER PUBLICATIONS

International Search Report dated Aug. 8, 2022, issued in International Application No. PCT/KR2022/005664.
(Continued)

*Primary Examiner* — Anthony J Daniels
(74) *Attorney, Agent, or Firm* — Jefferson IP Law, LLP

(57) ABSTRACT

A lens assembly is provided. The lens assembly includes an image sensor, at least four lenses successively arranged along an optical axis from an object side toward the image sensor side, and at least one band pass filter having a transmittance of 90% to 90% with regard to at least some of light in the wavelength area of 800~1000 nm. At least one of the lenses is disposed between the band pass filter and the image sensor. With regard to light in the wavelength area of 400~700 nm, at least one of the lenses has a transmittance of 0% to 10%, and all of the lenses have an average transmittance of 0% to 5%.

15 Claims, 12 Drawing Sheets

(51) Int. Cl.
  *G02B 9/34* (2006.01)
  *H04N 23/13* (2023.01)
  *H04N 23/45* (2023.01)
  *H04N 23/55* (2023.01)
  *H04N 23/56* (2023.01)
  *H04N 23/57* (2023.01)

(58) Field of Classification Search
  USPC .......................................................... 348/335
  See application file for complete search history.

(56) References Cited

U.S. PATENT DOCUMENTS

| | | |
|---|---|---|
| 2014/0036133 A1 | 2/2014 | Sekine et al. |
| 2014/0111850 A1 | 4/2014 | Huang et al. |
| 2014/0347494 A1 | 11/2014 | Yamazaki et al. |
| 2015/0168680 A1 | 6/2015 | Shih |
| 2017/0123192 A1 | 5/2017 | Scepanovic et al. |
| 2018/0052234 A1 | 2/2018 | Upton et al. |
| 2018/0210170 A1 | 7/2018 | Lee et al. |
| 2019/0064485 A1 | 2/2019 | Arita |
| 2019/0265440 A1 | 8/2019 | Tabata |
| 2020/0150387 A1 | 5/2020 | Kim et al. |
| 2020/0158991 A1 | 5/2020 | Kim et al. |
| 2020/0183128 A1 | 6/2020 | Lee et al. |

FOREIGN PATENT DOCUMENTS

| | | |
|---|---|---|
| KR | 10-2014-0048693 A | 4/2014 |
| KR | 10-2018-0088191 A | 8/2018 |
| KR | 10-2019-0024732 A | 3/2019 |
| KR | 10-2019-0103051 A | 9/2019 |
| KR | 10-2020-0055944 A | 5/2020 |
| KR | 10-2020-0058000 A | 5/2020 |
| KR | 10-2020-0068924 A | 6/2020 |
| KR | 10-2020-0145059 A | 12/2020 |

OTHER PUBLICATIONS

Korean Office Action dated Apr. 30, 2025, issued in Korean Application No. 10-2021-0079881.

* cited by examiner

LENS ASSEMBLY AND ELECTRONIC DEVICE COMPRISING SAME

CROSS-REFERENCE TO RELATED APPLICATION(S)

This application is a continuation application, claiming priority under § 365(c), of an International application No. PCT/KR2022/005664, filed on Apr. 20, 2022, which is based on and claims the benefit of a Korean patent application number 10-2021-0079881, filed on Jun. 21, 2021, in the Korean Intellectual Property Office, the disclosure of which is incorporated by reference herein in its entirety.

BACKGROUND

1. Field

The disclosure relates to an optical device. More particularly, the disclosure relates to a lens assembly including a plurality of lenses and an electronic device including the same.

2. Description of Related Art

Optical devices, for example, cameras capable of capturing images or videos have been widely used, and digital cameras or video cameras with solid image sensors such as charge coupled device (CCD) or complementary metal-oxide semiconductor (CMOS) have recently become commonplace. Solid image sensor (CCD or CMOS)-adopted optical devices may easily save, copy, or move images as compared with film-type optical devices.

Recently, a plurality of optical devices, e.g., two or more selected from a macro camera, a telephoto camera, and/or a wide-angle camera, are built in one electronic device to enhance the quality of shot images and give various visual effects to shot images. For example, it is possible to obtain images of an object with multiple cameras having different optical properties and synthesize the images to obtain a high-quality shot image. As equipped with a plurality of optical devices (e.g., cameras) to obtain high-quality images, electronic devices, such as mobile communication terminals or smartphones, are gradually replacing dedicated capturing devices, such as digital cameras.

The above information is presented as background information only to assist with an understanding of the disclosure. No determination has been made, and no assertion is made, as to whether any of the above might be applicable as prior art with regard to the disclosure.

SUMMARY

An electronic device is equipped with various features, such as object recognition, augmented reality, and/or three-dimensional (3D) scanners, using an optical device, and an additional optical device for detecting, e.g., depth, may enhance the accuracy of performing such function as object recognition as well as the quality of captured images. For example, it is possible to easily implement functions such as of an object capturing and object recognition 3D scanner by adding a time-of-flight (TOF) optical system for measuring the distance using the time taken for infrared-band light to reach the object and then return. However, controlling reflection, refraction, and/or scattering in the lens assembly may be limited, and light (hereinafter, 'stray light') caused by irregular reflection, refraction, and/or scattering in the lens assembly may deteriorate the accuracy of the forming image or distance measurement.

Aspects of the disclosure are to address at least the above-mentioned problems and/or disadvantages and to provide at least the advantages described below. Accordingly, an aspect of the disclosure is to provide a lens assembly with enhanced distance measurement accuracy and/or an electronic device including the same.

Another aspect of the disclosure is to provide a lens assembly capable of enhancing the quality of a captured image based on accurate distance measurement and/or an electronic device including the same.

Additional aspects will be set forth in part in the description which follows and, in part, will be apparent from the description, or may be learned by practice of the presented embodiments.

In accordance with an aspect of the disclosure, a lens assembly and an electronic device including the same are provided. The lens assembly includes an image sensor, at least four lenses sequentially arranged along an optical axis from an object side to the image sensor side, and at least one band pass filter having a transmittance of 90% to 98% for at least a portion of light in a wavelength range of 800 nanometer (nm) to 1000 nm. At least one of the lenses may be disposed between the band pass filter and the image sensor. For light in a wavelength range of 400 nm to 700 nm, at least one of the lenses may have a transmittance of 0% to 10%, and all of the lenses may have an average transmittance of 0% to 5%. A conditional equation '0.35<=POS/TTL<=1.2' may be met, where 'POS' is a distance from an object-side surface of a filter positioned farthest from the image sensor among the at least one band pass filter to an image surface of the image sensor, and 'TTL' is a distance from an object-side surface of a first lens closest to an object side among the lenses to the image surface.

In accordance with another aspect of the disclosure, a lens assembly and an electronic device including the same are provided. The lens assembly includes an image sensor, at least four lenses sequentially arranged along an optical axis from an object side to the image sensor side, and at least one band pass filter having a transmittance of 90% to 98% for at least a portion of light in a wavelength range of 800 nm to 1000 nm. At least one of the lenses may be disposed between the band pass filter and the image sensor. For light in a wavelength range of 400 nm to 700 nm, at least one of the lenses may have a transmittance of 0% to 10%. Conditional equations '0<=R max<0.5' and '0<=R avg<0.3' may be met, wherein 'R max' is a highest value in % of reflectances of the band pass filter for light in a wavelength range of 800 nm to 1000 nm, and 'R avg' is an average in % of the reflectances of the band pass filter for the light in the wavelength range of 800 nm to 1000 nm.

In accordance with another aspect of the disclosure, an electronic device is provided. The electronic device includes a first camera including a lens assembly and obtaining first information about an object from light incident through the lens assembly and a processor or an image signal processor configured to detect a distance to the object using the first camera. The lens assembly may comprise an image sensor, at least four lenses sequentially arranged along an optical axis from an object side to the image sensor side, and at least one band pass filter having a transmittance of 90% to 98% for at least a portion of light in a wavelength range of 800 nm to 1000 nm. At least one of the lenses may be disposed between the band pass filter and the image sensor. For light in a wavelength range of 400 nm to 700 nm, at least one of the lenses may have a transmittance of 0% to 10%, and all of the lenses may have an average transmittance of 0% to 5%. A conditional equation '0.35<=POS/TTL<=1.2' may be met, where 'POS' is a distance from an object-side surface of a filter positioned farthest from the image sensor among the at least one band pass filter to an image surface of the image sensor, and 'TTL' is a distance from an object-side surface of a first lens closest to an object side among the lenses to the image surface.

According to various embodiments of the disclosure, it is possible to suppress or prevent stray light in the lens assembly by blocking the light outside the wavelength range used for distance measurement and suppressing the reflection, refraction, and/or scattering of incident light by at least one of a bandpass filter and/or lenses. For example, the lens assembly and/or the electronic device including the same according to various embodiments of the disclosure may have enhanced accuracy in measuring the distance to the object and may enhance the quality of the captured image by capturing the object based on the measured distance. In an embodiment, it is possible to enhance the performance of the electronic device in functions, such as object recognition, augmented reality, and/or 3D scanner, by accurately measuring the distance to the object.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
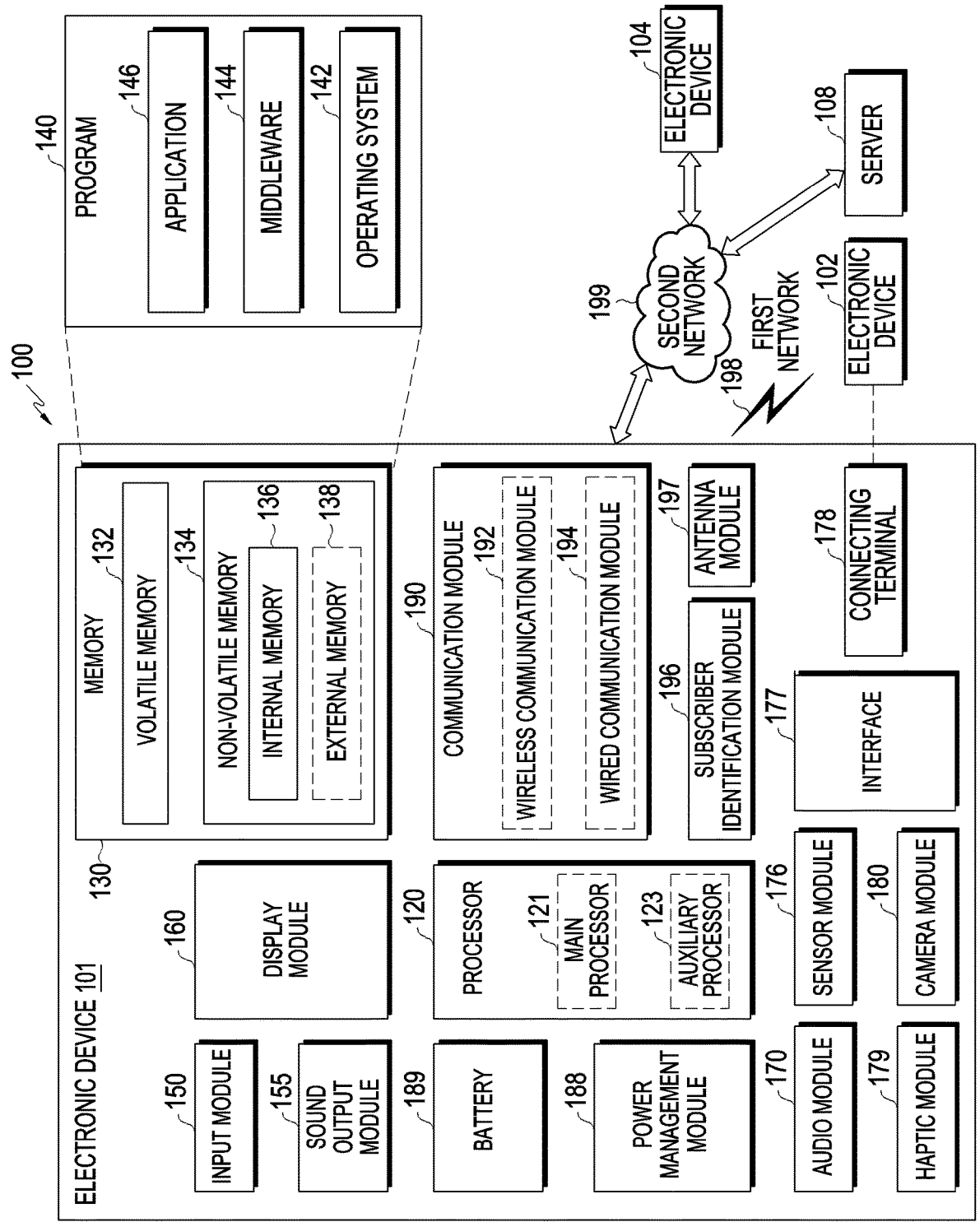
FIG. 1 is a view illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a $5^{th}$ generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
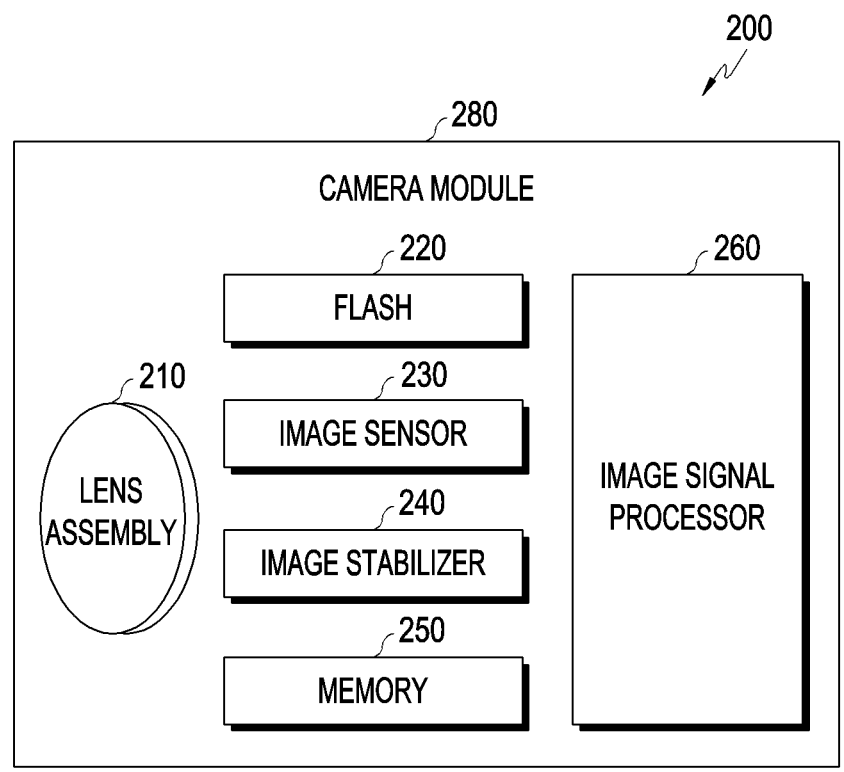
FIG. 2 is a block diagram illustrating a camera module according to an embodiment of the disclosure.

FIG. 2 is a block diagram illustrating the camera module (e.g., the camera module of FIG. 1) according to an embodiment of the disclosure.

Referring to FIG. 2, the block diagram 200 illustrates the camera module 280 may include a lens assembly 210, a flash 220, an image sensor 230, an image stabilizer 240, memory 250 (e.g., buffer memory), or an image signal processor 260. In some embodiments, the lens assembly 210 may include the image sensor 230. The lens assembly 210 may collect light emitted or reflected from an object whose image is to be taken. The lens assembly 210 may include one or more lenses. According to an embodiment, the camera module 280 may include a plurality of lens assemblies 210. In such a case, the camera module 280 may form, for example, a dual camera, a 360-degree camera, or a spherical camera. Some of the plurality of lens assemblies 210 may have the same lens attribute (e.g., field of view, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, e.g., a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 280 or the electronic device 201 including the camera module 180. This allows compensating for at least part of a negative effect (e.g., image blurring) by the movement on an image being captured. According to an embodiment, the image stabilizer 240 may sense such a movement by the camera module 280 or the electronic device (e.g., the electronic device 101 of FIG. 1) using a gyro sensor (not shown) or an acceleration sensor (not shown) disposed inside or outside the camera module 280. According to an embodiment, the image stabilizer 240 may be implemented as, e.g., an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160 of FIG. 1. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory (e.g., the memory 130 of FIG. 1) or as a separate memory that is operated independently from the memory.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 280. An image processed by the image signal processor 260 may be stored back in the memory 250 for further processing, or may be provided to an external component (e.g., the memory 130, the display device 160, the electronic device 102, the electronic device 104, or the server 108 of FIG. 1) outside the camera module 280. According to an embodiment, the image signal processor 260 may be configured as at least part of the processor (e.g., the processor 120 of FIG. 1), or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device (e.g., the electronic device 101 of FIG. 1) may include a plurality of camera modules 280 having different attributes or functions. In such a case, at least one of the plurality of camera modules 280 may form, for example, a wide-angle camera and at least another of the plurality of camera modules may form a telephoto camera. Similarly, at least one of the plurality of camera modules 280 may be a front camera and at least another of the plurality of camera modules may be a rear camera.

Figure 3:
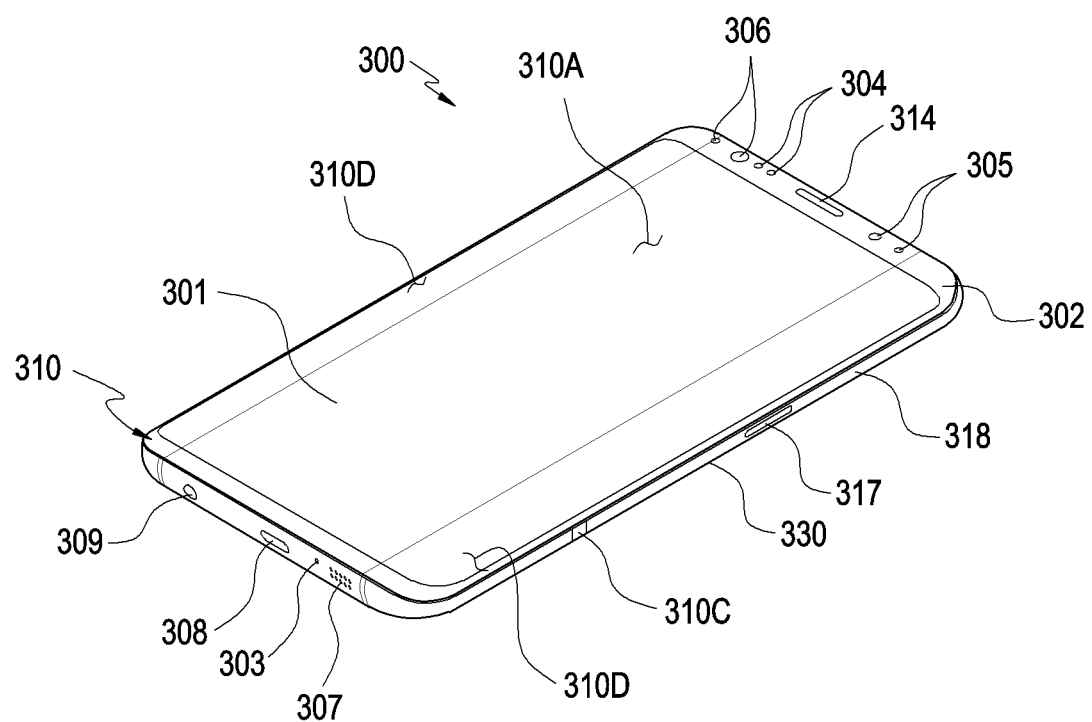
FIG. 3 is a front perspective view illustrating an electronic device according to an embodiment of the disclosure.
Figure 4:
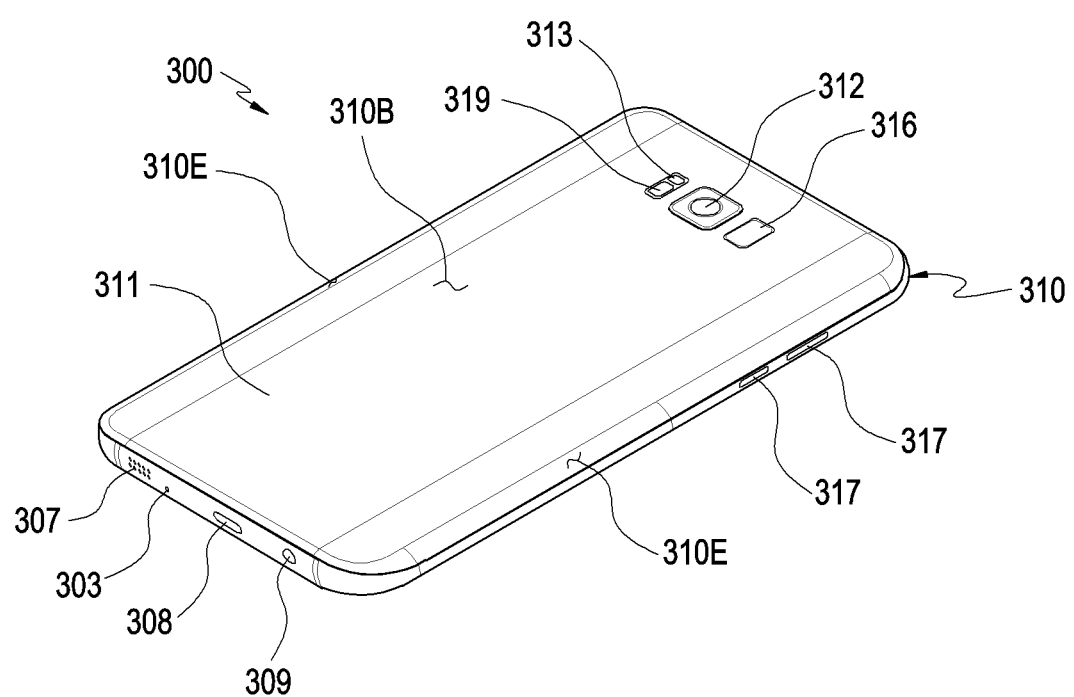
FIG. 4 is a rear perspective view illustrating the electronic device of FIG. 3 according to an embodiment of the disclosure.

FIG. 3 is a front perspective view illustrating an electronic device (e.g., the electronic device of FIG. 1) according to an embodiment of the disclosure. FIG. 4 is a rear perspective view illustrating the electronic device as illustrated in FIG. 3 according to an embodiment of the disclosure.

Referring to FIGS. 3 and 4, according to an embodiment, an electronic device 300 (e.g., the electronic device 101 of FIG. 1) may include a housing 310 including a first surface (or front surface) 310A, a second surface (or rear surface) 310B, and a side surface 310C surrounding a space between the first surface 310A and the second surface 310B. According to another embodiment (not shown), the housing 310 may denote a structure forming part of the first surface 310A, the second surface 310B, and the side surface 310C of FIG. 3. According to an embodiment, the first surface 310A may be formed by a front plate 302 (e.g., a glass plate or polymer plate with various coat layers) at least part of which is substantially transparent. According to another embodiment, the front plate 302 may be coupled with the housing 310 and, along with the housing 310, may form an internal space. According to various embodiments, the 'internal space' may mean a space, as an internal space of the housing 310, for receiving at least part of the display device 160 of FIG. 1 or the display 301 described below.

According to various embodiments, the second surface 310B may be formed of a substantially opaque back plate 311. The rear plate 311 may be formed of, e.g., laminated or colored glass, ceramic, polymer, metal (e.g., aluminum, stainless steel (STS), or magnesium), or a combination of at least two thereof. The side surface 310C may be formed by a side bezel structure (or a "side member") 318 that couples to the front plate 302 and the rear plate 311 and includes a metal and/or polymer. According to various embodiments, the rear plate 311 and the side bezel structure 318 may be integrally formed together and include the same material (e.g., a metal, such as aluminum).

In the embodiment illustrated, the front plate 302 may include two first areas 310D, which seamlessly and bendingly extend from the first surface 310A to the rear plate 311, on both the long edges of the front plate 302. In the embodiment (refer to FIG. 4) illustrated, the rear plate 311 may include two second areas 310E, which seamlessly and bendingly extend from the second surface 310B to the front plate, on both the long edges. According to various embodiment, the front plate 302 (or the rear plate 311) may include only one of the first areas 310D (or the second areas 310E). According to another embodiment, the first areas 310D or the second areas 301E may partially be excluded. In the above-described embodiments, at side view of the electronic device 300, the side bezel structure 318 may have a first thickness (or width) for sides (e.g., the side where the connector hole 308 is formed) that do not have the first areas 310D or the second areas 310E and a second thickness, which is smaller than the first thickness, for sides (e.g., the side where the key input device 317 is disposed) that have the first areas 310D or the second areas 310E.

According to an embodiment, the electronic device 300 may include at least one or more of a display 301, audio modules 303, 307, and 314, sensor modules 304, 316, and 319, camera modules 305, 312, and 313 (e.g., the camera module 180 or 280 of FIG. 1 or 2), key input devices 317, a light emitting device 306, and connector holes 308 and 309. According to various embodiments, the electronic device 300 may exclude at least one (e.g., the key input device 317 or the light emitting device 306) of the components or may add other components.

The display 301 (e.g., the display device 160 of FIG. 1) may be exposed through a significant portion of the front plate 302. According to various embodiments, at least a portion of the display 301 may be exposed through the front plate 302 forming the first surface 310A and the first areas 310D of the side surface 310C. According to various embodiments, the edge of the display 301 may be formed to be substantially the same in shape as an adjacent outer edge of the front plate 302. According to another embodiment (not shown), the interval between the outer edge of the display 301 and the outer edge of the front plate 302 may remain substantially even to give a larger area of exposure the display 301.

According to another embodiment (not shown), the screen display area (e.g., the active area), or an area (e.g., the inactive area) off the screen display area, of the display 301 may have a recess or opening in a portion thereof, and at least one or more of the audio module 314 (e.g., the audio module 170 of FIG. 1), sensor module 304 (e.g., the sensor module 176 of FIG. 1), camera module 305, and light emitting device 306 may be aligned with the recess or opening. According to another embodiment (not shown), at least one or more of the audio module 314, sensor module 304, camera module 305, fingerprint sensor 316, and light emitting device 306 may be included on the rear surface of the screen display area of the display 301. According to an embodiment (not shown), the display 301 may be disposed to be coupled with, or adjacent, a touch detecting circuit, a pressure sensor capable of measuring the strength (pressure) of touches, and/or a digitizer for detecting a magnetic field-type stylus pen. According to an embodiment, at least part of the sensor modules 304 and 319 and/or at least part of the key input device 317 may be disposed in the first areas 310D and/or the second areas 310E.

The audio modules 303, 307, and 314 may include a microphone hole 303 and speaker holes 307 and 314. The microphone hole 303 may have a microphone inside to obtain external sounds. According to an embodiment, there may be a plurality of microphones to be able to detect the direction of a sound. The speaker holes 307 and 314 may include an external speaker hole 307 and a phone receiver hole 314. According to an embodiment, the speaker holes 307 and 314 and the microphone hole 303 may be implemented as a single hole, or speakers may be rested without the speaker holes 307 and 314 (e.g., piezo speakers).

The sensor modules 304, 316, and 319 may generate an electrical signal or data value corresponding to an internal operating state or external environmental state of the electronic device 300. The sensor modules 304, 316, and 319 may include a first sensor module 304 (e.g., a proximity sensor) disposed on the first surface 310A of the housing 310, and/or a second sensor module (not shown) (e.g., a fingerprint sensor), and/or a third sensor module 319 (e.g., a heart-rate monitor (HRM) sensor) disposed on the second surface 310B of the housing 310, and/or a fourth sensor module 316 (e.g., a fingerprint sensor). The fingerprint sensor may be disposed on the second surface 310B as well as the first surface 310A (e.g., the display 301) of the housing 310. The electronic device 300 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 304.

The camera modules 305, 312, and 313 may include a first camera device 305 disposed on the first surface 310A of the electronic device 300, and a second camera device 312 and/or a flash 313 disposed on the second surface 310B. The camera modules 305 and 312 may include one or more lenses, an image sensor, and/or an image signal processor. The flash 313 may include, e.g., a light emitting diode (LED) or a xenon lamp. According to an embodiment, two or more lenses (an infrared (IR) camera, a wide-angle lens, and a telescopic lens) and image sensors may be disposed on one surface of the electronic device 300.

The key input device 317 may be disposed on the side surface 310C of the housing 310. According to an embodiment, the electronic device 300 may exclude all or some of the above-mentioned key input devices 317 and the excluded key input devices 317 may be implemented in other forms, e.g., as soft keys, on the display 301. According to an embodiment, the key input device may include the sensor module 316 disposed on the second surface 310B of the housing 310.

The light emitting device 306 may be disposed on, e.g., the first surface 310A of the housing 310. The light emitting device 306 may provide, e.g., information about the state of the electronic device 300 in the form of light. According to an embodiment, the light emitting device 306 may provide a light source that interacts with, e.g., the camera module 305. The light emitting device 306 may include, e.g., a light emitting diode (LED), an infrared (IR) LED, or a xenon lamp.

The connector holes 308 and 309 may include a first connector hole 308 for receiving a connector (e.g., a universal serial bus (USB) connector) for transmitting or receiving power and/or data to/from an external electronic device and/or a second connector hole 309 (e.g., an earphone jack) for receiving a connector for transmitting or receiving audio signals to/from the external electronic device.

Figure 5:
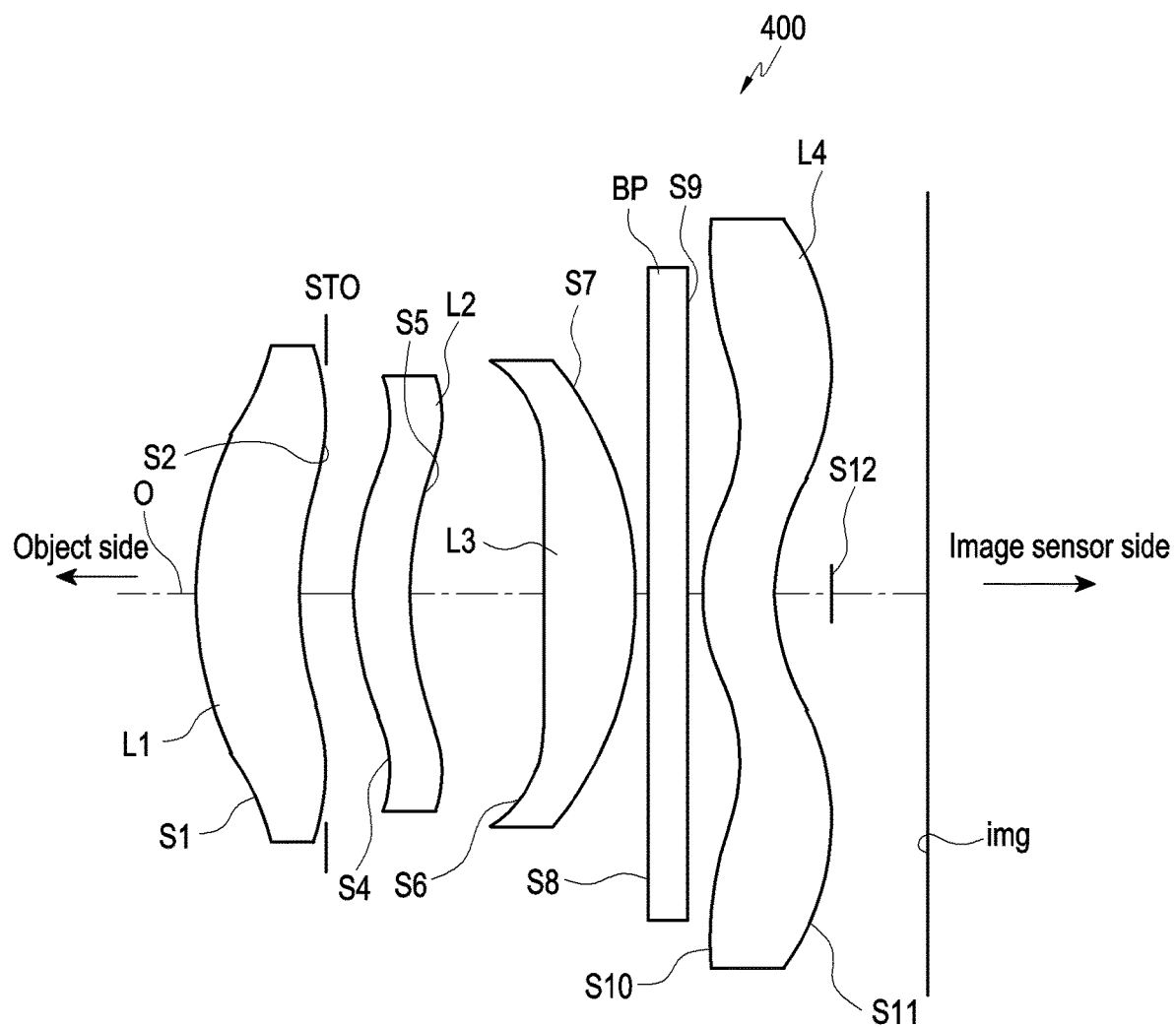
FIG. 5 is a view illustrating a configuration of a lens assembly according to an embodiment of the disclosure.
Figure 6:
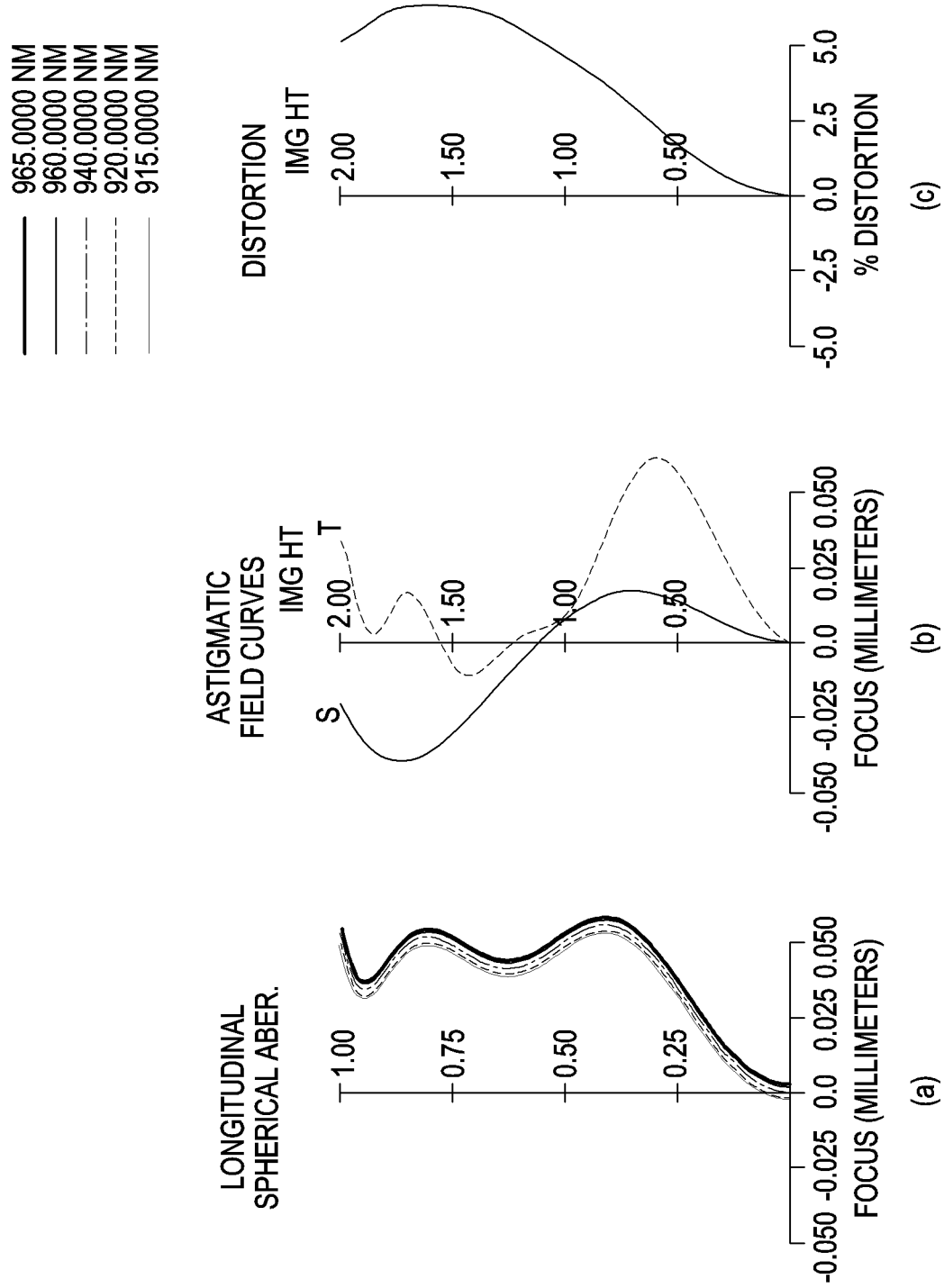
FIG. 6 is a graph illustrating the spherical aberration, astigmatism, and distortion of a lens assembly according to an embodiment of the disclosure.

FIG. 5 is a view illustrating a configuration of a lens assembly according to an embodiment of the disclosure. FIG. 6 is a graph illustrating the spherical aberration, astigmatism, and distortion of a lens assembly (e.g., the lens assembly of FIG. 5) according to an embodiment of the disclosure.

Part (a) of FIG. 6 is a graph showing the spherical aberration of the lens assembly 400 according to an embodiment of the disclosure. The horizontal axis denotes the coefficient of the longitudinal spherical aberration, and the vertical axis denotes the normalized distance from the center of the optical axis. Variations in the longitudinal spherical aberration according to the wavelength of light are shown. Part (b) of FIG. 6 is a graph illustrating astigmatism of the lens assembly 400 according to an embodiment of the disclosure, and part (c) of FIG. 6 is a graph illustrating a distortion rate of the lens assembly 400 according to an embodiment of the disclosure.

First, referring to FIG. 5, a lens assembly 400 (e.g., the lens assembly 210 of FIG. 2) according to one of various embodiments of the disclosure may include a plurality of lenses L1, L2, L3, and L4, a band pass filter BP, and/or an image sensor (e.g., an image surface img or the image sensor 230 of FIG. 2). According to an embodiment, the image sensor 230 may be described as a component separate from the lens assembly 400. For example, the image sensor 230 may be equipped in an electronic device (e.g., the electronic device 101, 102, 104, or 300 of FIG. 1 or 3) or an optical device (e.g., the camera module 180 or 280 of FIG. 1 or 2), and a plurality of lenses L1, L2, L3, and L4 constituting the lens assembly 400 may be mounted in the electronic device or optical device in a state of being aligned with the image sensor 230 on the optical axis O. In an embodiment, the lens assembly 400 may be disposed in any one of the camera modules 305, 312, and 313 of FIG. 3 or 4.

According to various embodiments, the plurality of lenses L1, L2, L3, and L4 may include a first lens L1, a second lens L2, a third lens L3, and/or a fourth lens L4 sequentially disposed along a direction from the object side to the image sensor 230 (e.g., the image surface img). For example, the lenses L1, L2, L3, and L4 may be aligned on the optical axis O together with the image sensor 230, and at least one of the lens surfaces S1, S2, S4, S5, S6, S7, S10, and S11 of the lenses L1, L2, L3, and L4 may include an aspheric surface. In an embodiment, the lenses L1, L2, L3, and L4 may be formed of a plastic material or a glass material.

Figure 11:
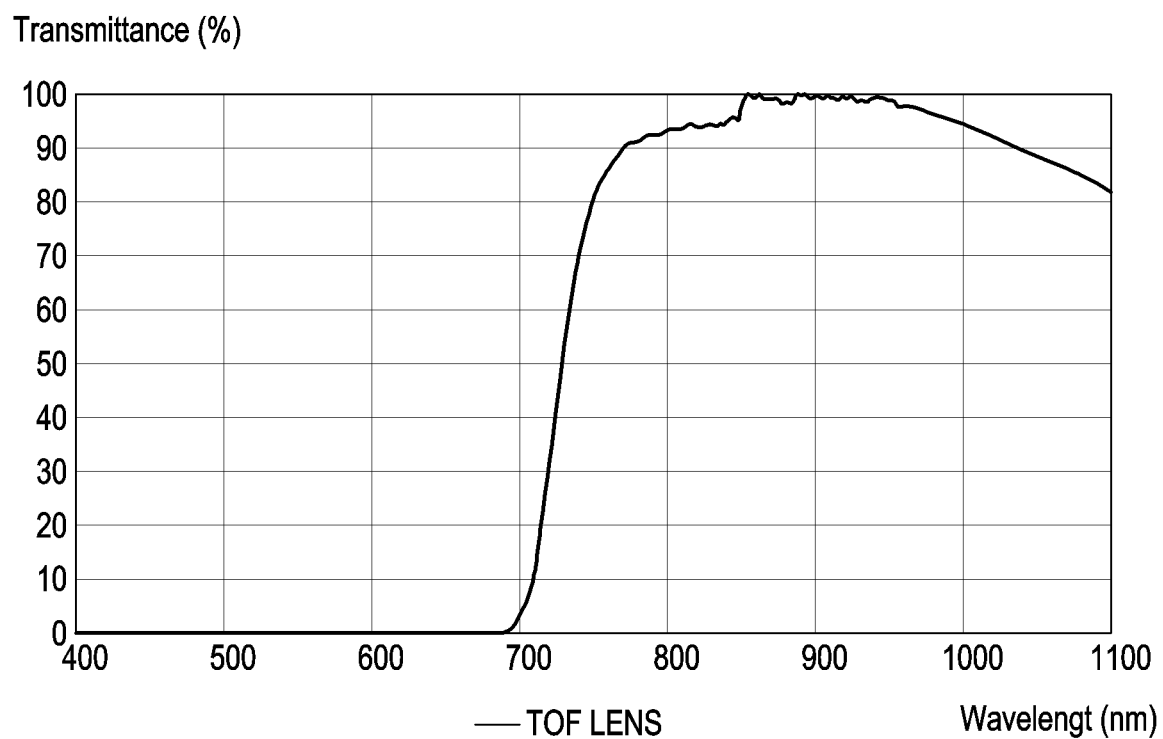
FIG. 11 is a graph illustrating an example light transmittance of any one of lenses in a lens assembly according to an embodiment of the disclosure.

According to various embodiments, at least one of the lenses L1, L2, L3, and L4 may have a transmittance of about 0% to 10% for visible light, e.g., light in a wavelength range of about 400 nm to 700 nm, and a combination of the lenses L1, L2, L3, and L4 may have an average transmittance of about 0% to 5% for visible light. In an embodiment, even if the visible light transmittance of at least one lens and/or a combination of the lenses L1, L2, L3, and L4 is 0%, the visible light may not be completely blocked. For example, even if the design specifications for the visible light transmittance is 0%, at least one lens actually manufactured or a combination of the lenses L1, L2, L3, and L4 may have a transmittance of about 0.001% for visible light. When at least one of the lenses L1, L2, L3, and L4 has a transmittance of about 10% or less for visible light, the lens assembly 400 may be mounted in a camera module that detects infrared light, e.g., light in a wavelength range of about 800 nm to 1000 nm. For example, when at least one of the lenses L1, L2, L3, and L4 has a transmittance of about 10% or less for visible light, the lens assembly 400 may function as a TOF optical system. A lens having a transmittance of about 10% or less for visible light is referred to below as a 'visible light blocking lens'. In the visible light blocking lens or the lens assembly 400 including the visible light blocking lens, the transmittance according to the wavelength range of light is illustrated in FIG. 11.

According to various embodiments, when at least one of the lenses L1, L2, L3, and L4 is a visible light blocking lens, the visible light blocking lens may suppress or prevent the generation of stray light in the lens assembly 400. For example, when the lens assembly 400 functions as a TOF optical system using light in a near-infrared or infrared wavelength range (e.g., a wavelength range of about 800 nm to 1000 nm), the visible light blocking lens may block light outside a designated wavelength range (e.g., a wavelength range of about 800 nm to 1000 nm) from entering the inside (e.g., the image surface img) of the lens assembly 400, thereby suppressing the generation of stray light. In an embodiment, the visible light blocking lens among the lenses L1, L2, L3, and L4 may be disposed closer to the object side than at least one other lens is. In another embodiment, the visible light blocking lens among the lenses L1, L2, L3, and L4 may be disposed closer to the object side than the band pass filter BP is.

According to various embodiments, the band pass filter BP may substantially transmit at least a portion of light in a wavelength range of about 800 nm to 1000 nm, and may block light outside the wavelength range of about 800 nm to 1000 nm. For example, the band pass filter BP may have a transmittance of 90% to 98% for near infrared rays and/or infrared rays. In an embodiment, when the wavelength range of the light detected by the lens assembly 400 is designated, the band pass filter BP may block the light outside the designated wavelength range, thereby blocking stray light from reaching the image surface img. In an embodiment, for the transmitted light (e.g., light in a wavelength range of about 800 nm to 1000 nm), the band pass filter BP may have a reflectance in a designated range. For example, stray light generated as light in a wavelength range of about 800 nm to 1000 nm is reflected or refracted by the band pass filter BP may be suppressed. This is described again with reference to Equations 4 and 5 below. In an embodiment, the band pass filter BP may be disposed to face the image surface img with at least one of the lenses L1, L2, L3, and L4 interposed therebetween. In the illustrated embodiment, the band pass filter BP is disposed between the third lens L3 and the fourth lens L4, and the fourth lens L4 is disposed between the band pass filter BP and the image surface img.

According to various embodiments, a TOF optical system (e.g., the lens assembly 400) based on a wavelength range of about 800 nm to 1000 nm may have an F number of about 0.9 to about 1.6. In configuring such a bright optical system, the lens assembly 400 may include at least four lenses, and the number of lenses may increase in proportion to the image height. Lenses constituting an optical system are intended for condensing light, but may act as reflective surfaces, so that as the number of lenses increases, the amount of stray light may increase, and manufacturing costs may increase. The aspheric lens may implement good optical performance even through a small number of combinations compared to the spherical lens while downsizing the lens assembly 400. In an embodiment, at least one lens may be disposed between the band pass filter BP and the image surface img, thereby suppressing the generation of stray light. For example, as illustrated in FIG. 5, visible light may be substantially blocked by the band pass filter BP, thereby suppressing at least visible light from being refracted, reflected, and/or scattered by the fourth lens L4 or the image surface Img. In another embodiment, when at least one of the lenses disposed closer to the object side than the band pass filter BP is a visible light blocking lens, the generation of stray light may be suppressed. For example, when the third lens L3 is a visible light blocking lens, it is possible to suppress at least visible light from being refracted, reflected, and/or scattered by the band pass filter BP, the fourth lens L4, or the image surface img.

According to various embodiments, the lens assembly 400 may be implemented with a smaller number (e.g., four or five) of lenses by including at least one aspheric lens and block light outside a designated wavelength range (e.g., a wavelength range of about 800 nm to 1000 nm) using the visible light blocking lens and/or the band pass filter BP. For example, the lens assembly 400 may be easily downsized while suppressing or preventing an increase in stray light. In an embodiment, when the first lens L1 is a visible light blocking lens or the band pass filter BP is disposed closer to the object side than the first lens L1 is, light outside the designated wavelength range may be substantially blocked from entering the lens assembly 400.

According to various embodiments, as at least one of the lenses L1, L2, L3, and L4 is disposed between the band pass filter BP and the image sensor 230 (e.g., the image surface img), and/or as the number of lenses disposed between the band pass filter BP and the image sensor 230 increases, the effect of suppressing stray light may increase. The arrangement of the band pass filter and/or the lenses L1, L2, L3, and L4 may meet Equation 1 below.

$$0.35 \leq POS/TTL \leq 1.2 \qquad \text{Equation 1}$$

Here, 'POS' may be the distance from the object-side surface (e.g., the eighth surface S8) of the filter positioned farthest from the image sensor 230 and/or the image surface Img among the band pass filters BP to the image surface Img, and 'TTL' may mean the distance, e.g., 'lens total length', from the object-side surface (e.g., the first surface S1) of the lens, e.g., the first lens L1, closest to the object side to the image surface Img.

According to various embodiments, although the band pass filter BP and/or the image surface img is a component for transmitting or receiving light, it may have optical reflectance. For example, when the band pass filter BP and/or the image surface img are disposed close to each other, the stray light may become stronger due to repeated reflection between the band pass filter BP and/or the image surface img. Through the arrangement condition as in Equation 1, the gap between the band pass filter BP and the image sensor 230 (e.g., the image surface img) may be increased within the structure of the lens assembly 400, and/or as described above, as the number of lenses disposed between the band pass filter BP and the image sensor 230 increases, it is possible to suppress the light outside the designated wavelength range from entering the inside (e.g., the image surface img) of the lens assembly 400 and to more effectively suppress stray light.

According to various embodiments, the lens assembly 400 may meet Equation 2 below.

$$TTL/IH \leq 2.0 \qquad \text{Equation 2}$$

Here, 'IH' may mean the paraxial image height, and the lens assembly 400 may be easily installed in a downsized electronic device (e.g., the electronic device 300 of FIG. 3 or 4) such as a mobile communication terminal or a smartphone by meeting the condition of Equation 2.

According to various embodiments, at least one of the object-side surface (e.g., the first surface S1) of the lens, e.g., the first lens L1, closest to the object side among the lenses L1, L2, L3, and L4 and the image sensor-side surface (e.g., the second surface S2) may be formed as a spheric surface including an inflection point. For example, the object-side surface of the first lens L1 may be convex, and the image sensor-side surface may be formed as an aspheric surface. According to an embodiment, when the lens, e.g., the first lens L1, closest to the object side includes an aspheric surface, it may be easy to control spherical aberration, comatic aberration, distortion aberration, and/or astigmatism. In another embodiment, when the first surface S1, e.g., the object-side surface of the first lens L1, is convex toward the object side, it may be easy to control comatic aberration.

According to various embodiments, among the lenses L1, L2, L3, and L4, the object-side surface (e.g., the tenth surface S10) of the lens (e.g., the fourth lens L4) closest to the image sensor 230 and/or the image surface img may be convex, and the image sensor-side surface (e.g., the seventh surface S7) of the lens (e.g., the third lens L3) second closest to the image sensor 230 and/or the image surface img may be convex. The above-described shapes of two lenses (e.g., the third lens L3 and/or the fourth lens L4) close to the image sensor 230 and/or the image surface img than the other lenses may facilitate control of comatic aberration or astigmatism. In an embodiment, the object-side surfaces (e.g., the first surface S1 and the fourth surface S4) of two lenses, e.g., the first lens L1 and the second lens L2, close to the object side among the lenses L1, L2, L3, and L4 may be convex. In another embodiment, the image sensor-side surface (e.g., the fifth surface S5) of the second lens L2 may be concave. The above-described shapes of the two lenses (e.g., the first lens L1 and the second lens L2) close to the object side than the other lenses may facilitate control of spherical aberration and/or comatic aberration. In an embodiment, when the shapes of the object-side surface of the first lens L1 and the image sensor-side surface of the second lens L2 are convex toward the object side, it may be easier to control spherical aberration and/or comatic aberration using the first lens L1 and the second lens L2.

According to various embodiments, at least two of the remaining lenses except for the lens, e.g., the first lens L1, closest to the object side among the lenses L1, L2, L3, and L4 may have the same refractive index for light in a designated wavelength range. Here, the 'designated wavelength range' may mean a wavelength range of about 800 nm to 1000 nm when the lens assembly 400 is used as a TOF optical system. In a general optical system, the material selection of the lens may be limited considering chromatic aberration or refractive index. In an embodiment, when the lens assembly 400 is used as a TOF optical system, e.g., when the lens assembly 400 is used to measure the distance using near-infrared rays, the wavelength band of detected light may be smaller than that of a general optical system. For example, the lens assembly 400 may be freer than a general optical system in selecting the material of the lens(s), and may have enhanced accuracy in distance detection while being downsized by including the lens(s) having a high refractive index.

Table 1 below shows lens data of the lens assembly 400, where 'object' may indicate the object, 'sto' may mean the aperture stop of the aperture, and 'S1 to S11' may indicate surfaces of related lenses L1, L2, L3, and L4 and/or the band pass filter BP. The lens assembly 400 may have a focal length of 2.585 mm, an F number of 1.029, a lens total length of 3.900 mm, and/or a paraxial image height of 2.1 mm, and may meet at least one of Equations 1 and 2 described above. For example, the ratio of the POS between the band pass filter and the image surface to the lens total length TTL may be about 0.38, and the lens assembly 500 may meet Equation 1, and the ratio of the lens total length to the paraxial image height IH may be about 1.86, and the lens assembly 500 may meet Equation 2.

TABLE 1

| surface | radius of curvature | thickness or air gap | lens radius | focal length | Refractive index | Abbe number |
|---|---|---|---|---|---|---|
| obj | Infinity | 10000 | | | | |
| S1 | 1.78180 | 0.58750 | 1.32000 | 9.325 | 1.56576 | 30.19 |
| S2 | 2.36994 | 0.10645 | 1.24500 | | | |
| sto | Infinity | 0.15038 | 1.22000 | | | |
| S4 | 1.38199 | 0.30389 | 1.12500 | 7.281 | 1.64303 | 19.24 |
| S5 | 1.79206 | 0.71384 | 1.16500 | | | |
| S6 | 16.48161 | 0.46729 | 1.18400 | 13.227 | 1.64303 | 19.24 |
| S7 | −17.37972 | 0.08500 | 1.28000 | | | |
| S8 | Infinity | 0.21000 | 1.64381 | infinity | 1.50838 | 64.2 |
| S9 | Infinity | 0.08500 | 1.74247 | | | |
| S10 | 0.80944 | 0.36868 | 1.86000 | 6.812 | 1.64303 | 19.24 |
| S11 | 0.81591 | 0.32191 | 1.98000 | | | |
| S12 | Infinity | 0.45534 | 2.03441 | | | |
| img | Infinity | 0.04500 | | | | |

Tables 2 and 3 below show the aspheric coefficients of the first to fourth lenses L1, L2, L3, and L4, and a definition of aspherical surface may be obtained by Equation 3 as follows:

$$x = \frac{c'y^2}{1 + \sqrt{1 - (K+1)c'^2 y^2}} + Ay^4 + By^6 + Cy^8 + Dy^{10} + Ey^{12} + Fy^{14} + Gy^{16} + Hy^{18} + Jy^{20} \qquad \text{Equation 3}$$

Here, 'x' may mean the distance from the vertex of the lens in the direction of the optical axis O, 'y' the distance in the direction perpendicular to the optical axis O, 'c' the reciprocal of the radius of curvature at the vertex of the lens, 'K' the conic constant, and each of 'A', 'B', 'C', 'D', 'E', 'F', 'G', 'H', and 'J' the aspheric coefficient.

TABLE 2

| surface | S1 | S2 | S4 | S5 |
|---|---|---|---|---|
| K(Conic) | −5.96357E−01 | −8.48200E+00 | −5.54266E+00 | −3.70463E+00 |
| A(4th)/C4 | −1.35598E−03 | −3.19970E−03 | 1.40329E−01 | 6.16611E−02 |
| B(6th)/C5 | −7.06966E−02 | −2.63639E−01 | −2.69119E−01 | 2.27020E−01 |
| C(8th)/C6 | 2.43219E−01 | 7.58293E−01 | 9.63057E−02 | −1.98528E+00 |

TABLE 2-continued

| surface | S1 | S2 | S4 | S5 |
|---|---|---|---|---|
| D(10th)/C7 | −4.36352E−01 | −1.42670E+00 | 5.97865E−03 | 5.39394E+00 |
| E(12th)/C8 | 4.28191E−01 | 1.75406E+00 | −2.07518E−01 | −8.86474E+00 |
| F(14th)/C9 | −2.30459E−01 | −1.38958E+00 | 3.71717E−01 | 9.12279E+00 |
| G(16th)/C10 | 5.66918E−02 | 6.77003E−01 | −2.62838E−01 | −5.67777E+00 |
| H(18th)/C11 | −7.40499E−04 | −1.83651E−01 | 8.12841E−02 | 1.94493E+00 |
| J(20th)/C12 | −1.58411E−03 | 2.11492E−02 | −1.01318E−02 | −2.81237E−01 |

TABLE 3

| surface | S6 | S7 | S10 | S11 |
|---|---|---|---|---|
| K(Conic) | −9.39381E+01 | 9.90000E+01 | −3.79141E+00 | −1.46200E+00 |
| A(4th)/C4 | −2.28234E−01 | −6.99922E−01 | −1.00441E−01 | −3.17596E−01 |
| B(6th)/C5 | 9.95345E−01 | 2.12269E+00 | −3.58925E−01 | −8.47629E−02 |
| C(8th)/C6 | −3.40019E+00 | −5.58335E+00 | 4.75254E−01 | 4.24810E−01 |
| D(10th)/C7 | 7.82259E+00 | 1.07623E+01 | −2.64669E−01 | −4.52505E−01 |
| E(12th)/C8 | −1.25312E+01 | −1.42765E+01 | 6.58670E−02 | 2.68372E−01 |
| F(14th)/C9 | 1.33896E+01 | 1.24500E+01 | 2.15903E−01 | −9.78809E−02 |
| G(16th)/C10 | −8.96601E+00 | −6.76220E+00 | −5.45157E−03 | 2.17252E−02 |
| H(18th)/C11 | 3.35003E+00 | 2.05900E+00 | 1.22444E−03 | −2.69036E−03 |
| J(20th)/C12 | −5.26585E−01 | −2.66280E−01 | −9.14004E−05 | 1.42490E−04 |

According to various embodiments, it is possible to suppress the generation of stray light in the lens assembly 400 by controlling the reflectance of the lens assembly 400, e.g., the band pass filter BP and/or the lenses L1, L2, L3, and L4. According to an embodiment, the reflectance of the band pass filter BP for light in a wavelength range of about 800 nm to 1000 nm may meet at least one of Equations 4 and 5 below.

$$0\% \leq R_{max} \leq 0.5\%$$ Equation 4

$$0\% \leq R_{avg} \leq 0.3\%$$ Equation 5

In an embodiment, when the lens assembly 400 is utilized as a TOF optical system, light in a wavelength range of about 920 nm to 960 nm or a wavelength range of 820 nm to 870 nm may reach the image sensor. In Equations 4 and 5, the maximum reflectance and the average reflectance of the band pass filter BP for light in the wavelength range of +/−10 nm (the wavelength of light reaching the image sensor) are denoted as 'Rmax' and 'Ravg', respectively.

As such, it is possible to suppress stray light by controlling the reflectance of the band pass filter BP and blocking light outside the designated wavelength range from entering the inside of the lens assembly 400 and/or the image sensor 230 using the lenses L1, L2, L3, and L4 and/or the band pass filter BP. By suppressing light, when the lens assembly 400 is used as a TOF optical system, the accuracy of distance measurement may be enhanced, and by performing object capturing or object recognition based on the measured distance, the quality of a captured image or the accuracy of object recognition of the lens assembly 400 or an electronic device (e.g., the electronic device 101, 102, 104, or 300 of FIGS. 1, 3, and/or 4) including the lens assembly 400 may be enhanced.

In the following description, the components easy to understand from the description of the above embodiments are denoted with or without the same reference numerals and their detailed description may be skipped.

Figure 7:
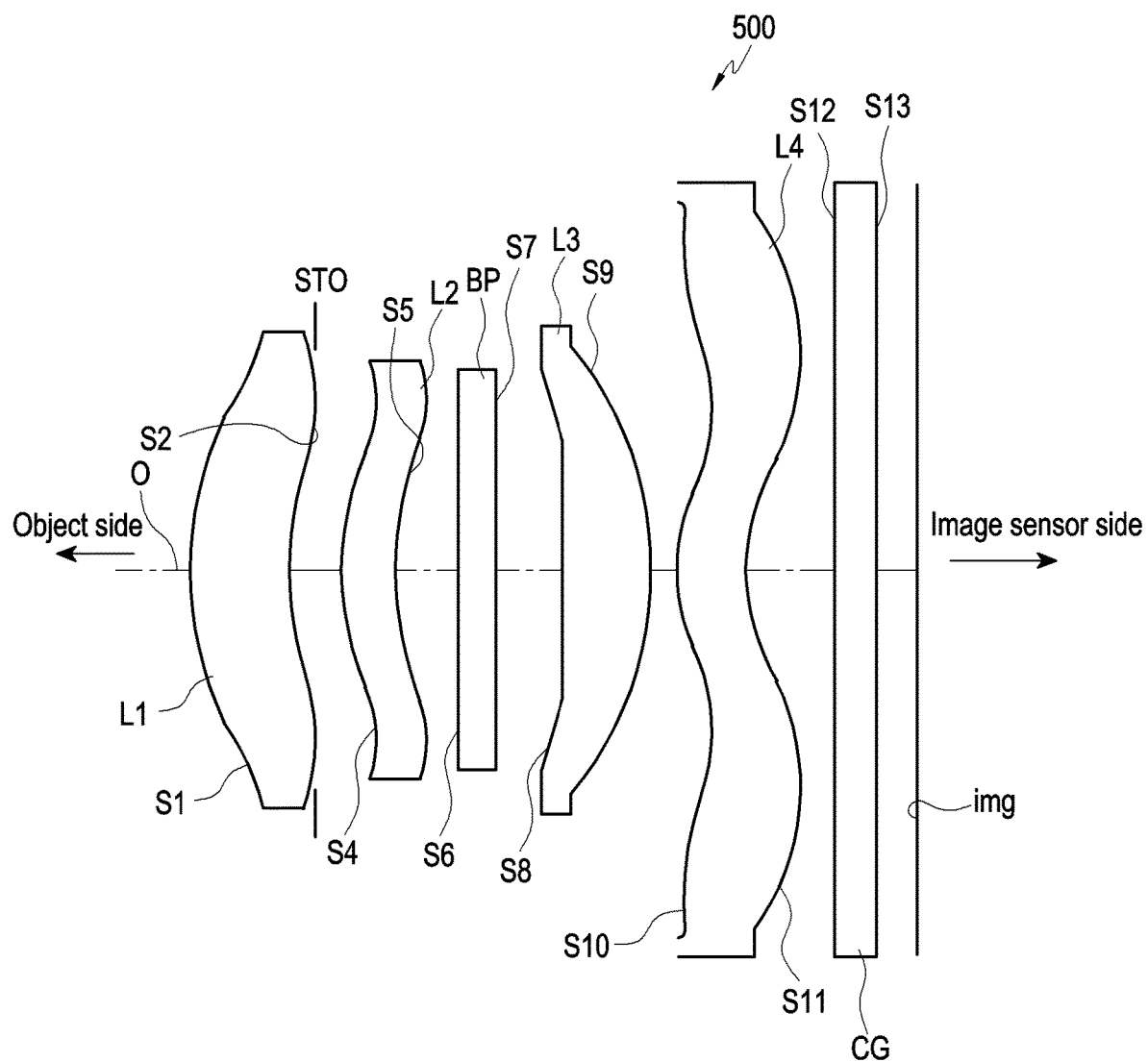
FIG. 7 is a view illustrating a configuration of a lens assembly according to an embodiment of the disclosure.
Figure 8:
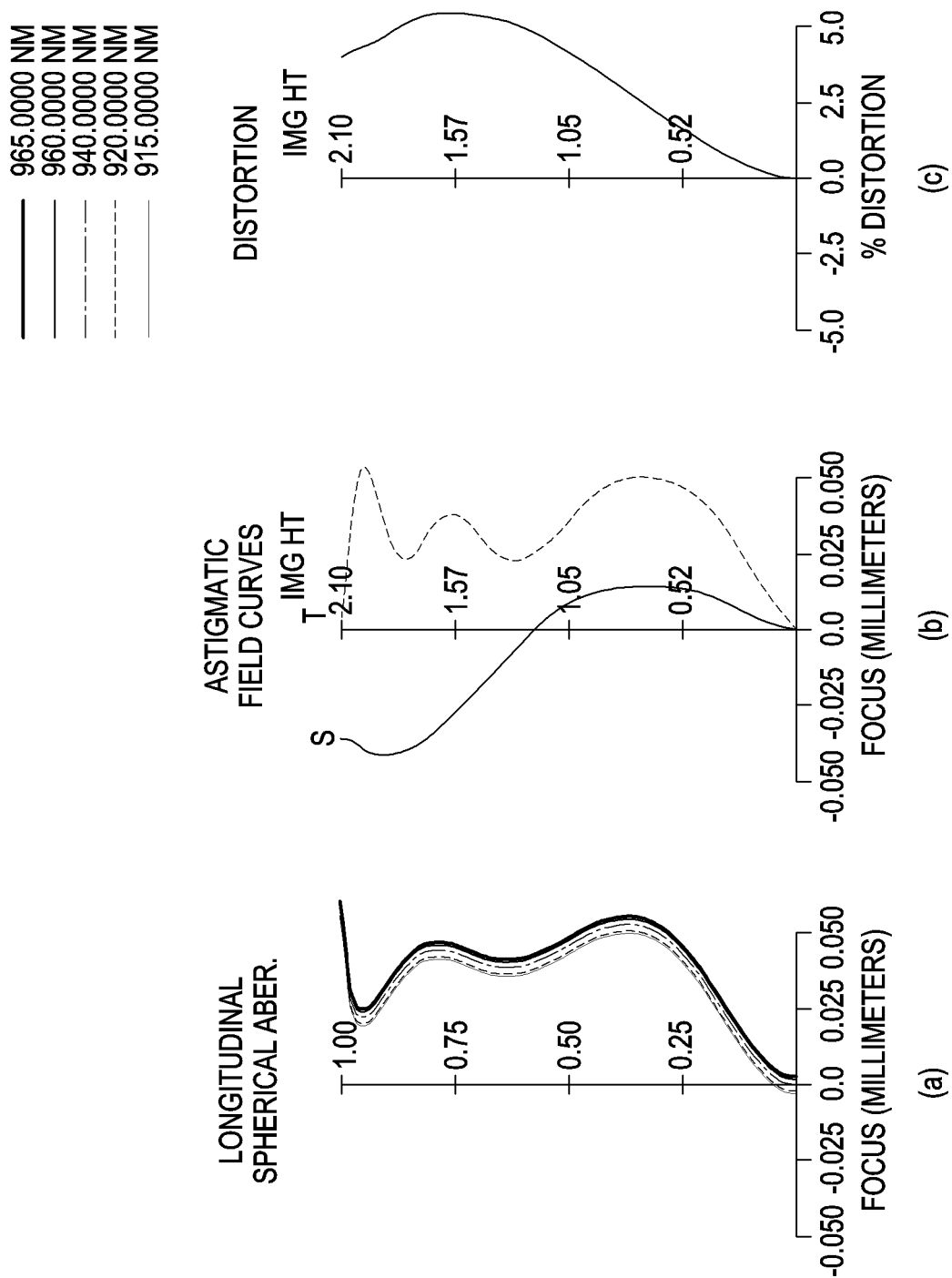
FIG. 8 is a graph illustrating the spherical aberration, astigmatism, and distortion of a lens assembly according to an embodiment of the disclosure.

FIG. 7 is a view illustrating a configuration of a lens assembly according to an embodiment of the disclosure. FIG. 8 is a graph illustrating the spherical aberration, astigmatism, and distortion of a lens assembly according to an embodiment of the disclosure.

Referring to FIGS. 7 and 8, a lens assembly 500 may include first to fourth lenses L1, L2, L3, and L4 and a band pass filter BP, and the first to fourth lenses L1, L2, L3, and L4 may be sequentially arranged along the optical axis O in a direction from the object side to the image sensor 230 (e.g., the image surface img) side. In this embodiment, the band pass filter BP may be disposed between the second lens L2 and the third lens L3, and the third lens L3 and the fourth lens L4 may be disposed between the band pass filter BP and the image surface img. Although there are some differences in detailed shapes, lens data, and the like of the first to fourth lenses L1, L2, L3, and L4, the lens assembly 500 may meet at least one of the conditions described through the above embodiments. The "conditions described through the above embodiment" may include characteristics related to at least one visible light blocking lens or band pass filter BP, the correlation between two lenses L1 and L2 (e.g., the first lens L1 and second lens L2 of FIG. 5) disposed adjacent to each other and closest to the object side, the correlation between two lenses L3 and L4 (e.g., the third lens L3 and fourth lens L4 of FIG. 5) disposed adjacent to each other and closest to the image sensor side, configurations regarding the lens surface shapes or inflection points of the first to fourth lenses L1, L2, L3, and L4, the conditions suggested through Equations 1, 2, 4, and/or 5, or the material of the first to fourth lenses L1, L2, L3, and L4.

Table 4 below shows lens data of the lens assembly 500, where 'object' may indicate the object, 'sto' may mean the aperture stop of the aperture, and 'S1 to S11' may indicate surfaces of related lenses L1, L2, L3, and L4 and/or the band pass filter BP. In an embodiment, the lens assembly 500 may further include a cover glass CG disposed in front of or behind the array of the lenses L1, L2, L3, and L4, and 'S12' and 'S13' may mean surfaces of the cover glass CG. The lens assembly 500 may have a focal length of 2.54 mm, an F number of 1.016 mm, a lens total length of 3.900 mm, and a paraxial image height of 2.1 mm, and may meet at least one of the above-described equations. For example, the ratio of the POS between the band pass filter and the image surface to the lens total length TTL may be about 0.65, and the lens assembly 500 may meet Equation 1, and the ratio of the lens total length to the paraxial image height IH may be about 1.86, and the lens assembly 500 may meet Equation 2.

TABLE 4

| surface | radius of curvature | thickness or air gap | lens radius | focal length | Refractive index | Abbe number |
|---|---|---|---|---|---|---|
| obj | Infinity | 1000 | | | | |
| S1 | 1.78180 | 0.58750 | 1.32000 | 9.325 | 1.56576 | 30.19 |
| S2 | 2.36994 | 0.10945 | 1.24500 | | | |
| sto | Infinity | 0.14088 | 1.21000 | | | |
| S4 | 1.42755 | 0.30000 | 1.12500 | 6.848 | 1.64303 | 19.24 |
| S5 | 1.93856 | 0.22681 | 1.16500 | | | |
| S6 | Infinity | 0.21000 | 1.17042 | infinity | 1.50838 | 64.2 |
| S7 | Infinity | 0.30402 | 1.17641 | | | |
| S8 | 27.16776 | 0.45277 | 1.18400 | 14.083 | 1.64303 | 19.24 |
| S9 | −13.49474 | 0.30037 | 1.28000 | | | |
| S10 | 0.80944 | 0.36868 | 1.86000 | 6.812 | 1.64303 | 19.24 |
| S11 | 0.81591 | 0.31951 | 1.98000 | | | |
| S12 | Infinity | 0.21000 | 2.03174 | infinity | 1.50838 | 64.2 |
| S13 | Infinity | 0.33100 | 2.06045 | | | |
| img | Infinity | 0.03900 | | | | |

Tables 5 and 6 below show the aspheric coefficients of the first to fourth lenses L1, L2, L3, and L4.

TABLE 5

| surface | S1 | S2 | S4 | S5 |
|---|---|---|---|---|
| K(Conic) | −5.96357E−01 | −8.48200E+00 | −6.26078E+00 | −4.41790E+00 |
| A(4th)/C4 | −1.35598E−03 | −3.19970E−03 | 1.28396E−01 | 9.02923E−02 |
| B(6th)/C5 | −7.06966E−02 | −2.63639E−01 | −7.16216E−02 | −1.70760E−01 |
| C(8th)/C6 | 2.43219E−01 | 7.58293E−01 | −1.10343E+00 | 1.13974E−01 |
| D(10th)/C7 | −4.36352E−01 | −1.42670E+00 | 3.76394E+00 | −7.33500E−01 |
| E(12th)/C8 | 4.28191E−01 | 1.75406E+00 | −7.35062E+00 | 1.74857E+00 |
| F(14th)/C9 | −2.30459E−01 | −1.38958E+00 | 8.85651E+00 | −2.07141E+00 |
| G(16th)/C10 | 5.66918E−02 | 6.77003E−01 | −6.41210E+00 | 1.37951E+00 |
| H(18th)/C11 | −7.40499E−04 | −1.83651E−01 | 2.56631E+00 | −4.96101E−01 |
| J(20th)/C12 | −1.58411E−03 | 2.11492E−02 | −4.38669E−01 | 7.46068E−02 |

TABLE 6

| surface | S8 | S9 | S10 | S11 |
|---|---|---|---|---|
| K(Conic) | 9.90000E+01 | −9.90000E+01 | −3.79141E+00 | −1.46200E+00 |
| A(4th)/C4 | −1.85756E−01 | −6.43368E−01 | −1.00441E+00 | −3.17596E−01 |
| B(6th)/C5 | 7.09035E−01 | 1.51410E+00 | −3.58925E−01 | −8.47629E−02 |
| C(8th)/C6 | −2.12697E+00 | −2.62348E+00 | 4.75254E−01 | 4.24810E−01 |
| D(10th)/C7 | 4.15566E+00 | 2.72076E+00 | −2.64669E−01 | −4.52505E−01 |
| E(12th)/C8 | −5.57818E+00 | −1.11066E+00 | 6.58670E−02 | 2.68372E−01 |
| F(14th)/C9 | 5.07281E+00 | −6.97258E−01 | 2.15903E−03 | −9.78809E−02 |
| G(16th)/C10 | −3.01967E+00 | 1.04122E+00 | −5.45157E−03 | 2.17252E−02 |
| H(18th)/C11 | 1.07347E+00 | −4.54624E−01 | 1.22444E−03 | −2.69036E−03 |
| J(20th)/C12 | −1.72963E−01 | 7.00510E−02 | −9.14004E−05 | 1.42490E−04 |

Figure 9:
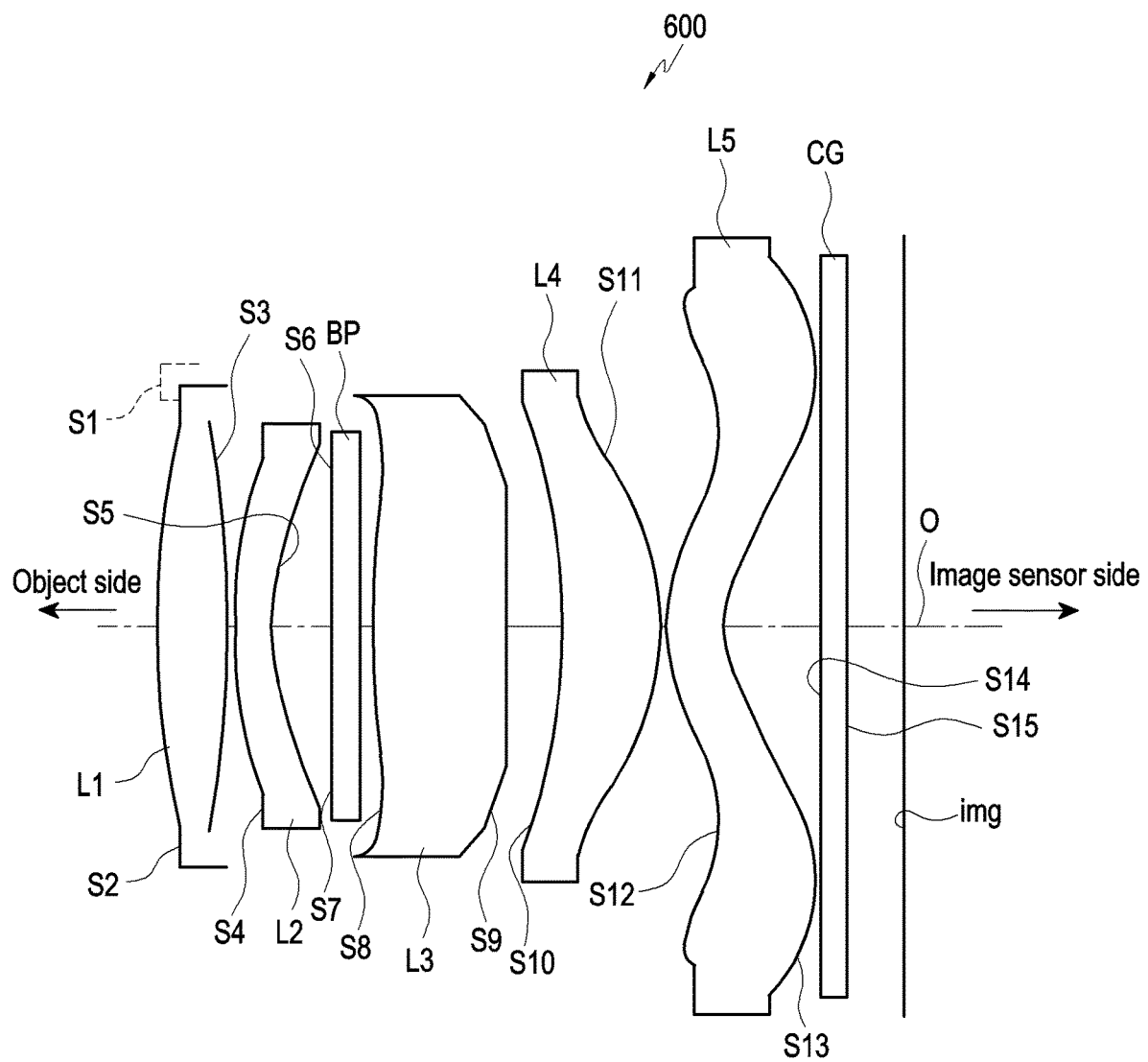
FIG. 9 is a view illustrating a configuration of a lens assembly according to an embodiment of the disclosure.
Figure 10:
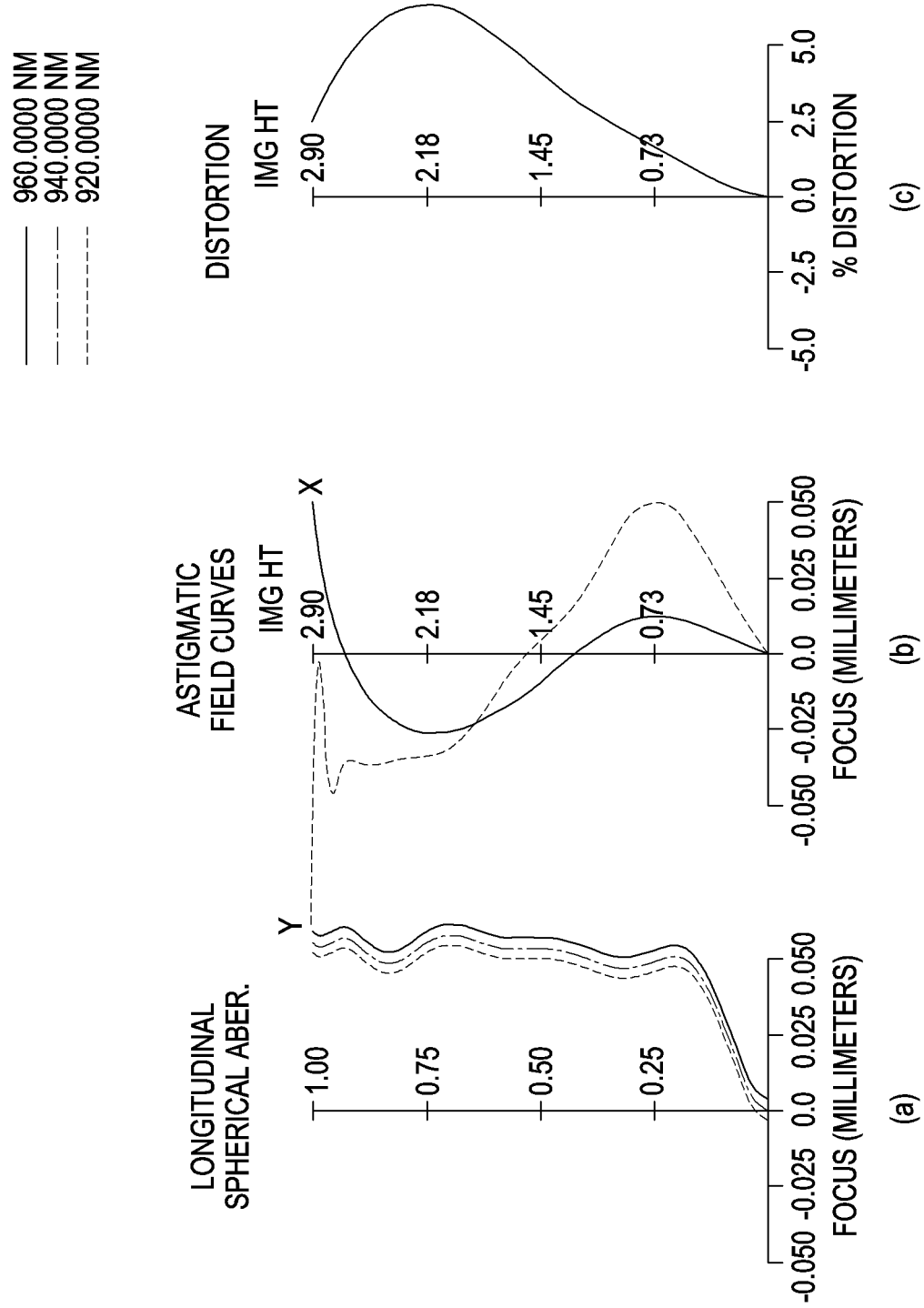
FIG. 10 is a graph illustrating the spherical aberration, astigmatism, and distortion of a lens assembly according to an embodiment of the disclosure.

FIG. 9 is a view illustrating a configuration of a lens assembly according to an embodiment of the disclosure. FIG. 10 is a graph illustrating the spherical aberration, astigmatism, and distortion of a lens assembly according to an embodiment of the disclosure.

FIG. 11 is a graph illustrating an example light transmittance of any one of lenses in a lens assembly according to an embodiment of the disclosure.

According to various embodiments, the lens assembly 600 may not include a stop (e.g., the stop of FIG. 5 or the aperture stop sto of the aperture). For example, in the lens assembly 600, the object-side surface S2 of the first lens L1 may function as an aperture stop of the lens assembly 500.

Referring to FIGS. 9 and 10, the lens assembly 600 may include first to fifth lenses L1, L2, L3, L4, and L5 and a band pass filter BP, and the first to fifth lenses L1, L2, L3, L4, and L5 may be sequentially arranged along the optical axis O in a direction from the object side to the image sensor (e.g., the image surface img) side. Although there are some differences in detailed shapes, lens data, and the like of the first to fifth lenses L1, L2, L3, L4, and L5, the lens assembly 600 may meet at least one of the conditions described through the above embodiments. The "conditions described through the above embodiment" may include characteristics related to at least one visible light blocking lens or band pass filter BP, the correlation between two lenses L1 and L2 (e.g., the first lens L1 and second lens L2 of FIG. 5) disposed adjacent to each other and closest to the object side, the correlation between two lenses L4 and L5 (e.g., the third lens L3 and fourth lens L4 of FIG. 5) disposed adjacent to each other and closest to the image sensor side, configurations regarding the lens surface shapes or inflection points of the first to fourth lenses L1, L2, L3, and L4, the conditions suggested through Equations 1, 2, 4, and/or 5, or the material of the first to fourth lenses L1, L2, L3, and L4.

Table 7 below shows the lens data of the lens assembly 600, and the object-side surface (e.g., the fourth surface S4) of the second lens L2 may function as the aperture stop of the aperture, and 'S2 to S13' may indicate the surfaces of the related lenses L1, L2, L3, L4, and L5 and/or the band pass filter BP. The first surface S1 may mean the object-side surface of the mechanical structure (e.g., a barrel) that arranges or fixes the lenses L1, L2, L3, L4, and L5, and the fourteenth surface S14 and the fifteenth surface S15 may mean surfaces of the cover glass CG. The lens assembly 600 may have a focal length of 3.033 mm, an F number of 1.042 mm, a lens total length of 5.560 mm, and a paraxial image height of 2.9 mm, and may meet at least one of the above-described equations. For example, the distance POS between the band pass filter and the image surface relative to the lens total length TTL may be about 0.77, and the lens assembly 600 may meet Equation 1, and the lens total length relative to the paraxial image height IH may be about 1.92, and the lens assembly 600 may meet Equation 2.

TABLE 7

| surface | radius of curvature | thickness or air gap | lens radius | focal length | Refractive index | Abbe number |
|---|---|---|---|---|---|---|
| obj | Infinity | 1000 | | | | |
| S1 | Infinity | 0.00000 | 1.63937 | | | |
| S2 | 6.73414 | 0.50885 | 1.49000 | 5.271 | 1.61576 | 23.27 |
| S3 | −6.08515 | 0.04304 | 1.45500 | | | |
| S4 (sto) | 2.07087 | 0.29363 | 1.36500 | −9.160 | 1.52634 | 55.71 |
| S5 | 1.37782 | 0.45117 | 1.36500 | | | |
| S6 | Infinity | 0.21000 | 1.39813 | infinity | 1.50838 | 64.2 |
| S7 | Infinity | 0.09285 | 1.44796 | | | |
| S8 | 5.65450 | 1.03131 | 1.50000 | 7.014 | 1.64303 | 19.24 |
| S9 | −20.69759 | 0.38668 | 1.71167 | | | |
| S10 | −2.99752 | 0.73305 | 1.69500 | 4.615 | 1.64303 | 19.24 |
| S11 | −1.63394 | 0.03500 | 1.81500 | | | |
| S12 | 1.13595 | 0.43320 | 2.53000 | −14.860 | 1.64303 | 19.24 |
| S13 | 0.86373 | 0.68459 | 2.77000 | | | |
| S14 | Infinity | 0.21000 | 2.72359 | infinity | 1.50838 | 64.2 |
| S15 | Infinity | 0.39238 | 2.76351 | | | |
| img | Infinity | 0.0539 | | | | |

Tables 8 and 9 below show the aspheric coefficients of the first to fifth lenses L1, L2, L3, L4, and L5.

TABLE 8

| surface | S2 | S3 | S4 | S5 | S8 |
|---|---|---|---|---|---|
| K(Conic) | −5.53408E+00 | 1.36400E+01 | −3.71027E+01 | −6.70843E+00 | −3.96441E+01 |
| A(4th)/C4 | 1.42869E−02 | 1.12349E−02 | 2.14639E−01 | 3.94576E−02 | 1.98733E−03 |
| B(6th)/C5 | −2.96150E−03 | 1.51033E−01 | −6.29948E−01 | −1.82467E−01 | 3.47678E−02 |
| C(8th)/C6 | −7.47399E−02 | −3.85050E−01 | 1.31076E+00 | 5.46593E−01 | −1.48430E−01 |
| D(10th)/C7 | 2.13494E−01 | 5.87853E−01 | −1.82609E+00 | −1.06299E+00 | 2.62496E−01 |
| E(12th)/C8 | −2.82862E−01 | −5.80146E−01 | 1.64863E+00 | 1.30247E+00 | −2.79347E−01 |
| F(14th)/C9 | 2.10602E−01 | 3.67191E−01 | −9.48963E−01 | −1.01142E+00 | 1.84400E−01 |
| G(16th)/C10 | −9.04635E−02 | −1.43157E−01 | 3.32922E−01 | 4.82203E−01 | −7.42603E−02 |
| H(18th)/C11 | 2.09311E−02 | 3.11756E−02 | −6.42221E−02 | −1.28659E−01 | 1.66668E−02 |
| J(20th)/C12 | −2.02247E−03 | −2.89094E−03 | 5.16800E−03 | 1.47388E−02 | −1.58464E−03 |

According to various embodiments, when an optical filter (e.g., an infrared filter or a band pass filter (BP)) is disposed in an optical system (e.g., the lens assembly 400 of FIG. 5), it may be common for the optical filter to be disposed closer to the image sensor side than the lenses. As described above, according to various embodiments of the disclosure, by disposing at least one lens between the band pass filter BP and the image sensor (e.g., the image surface (img)), it is possible to enhance the generation of stray light in configuring the TOF optical system.

Figure 12:
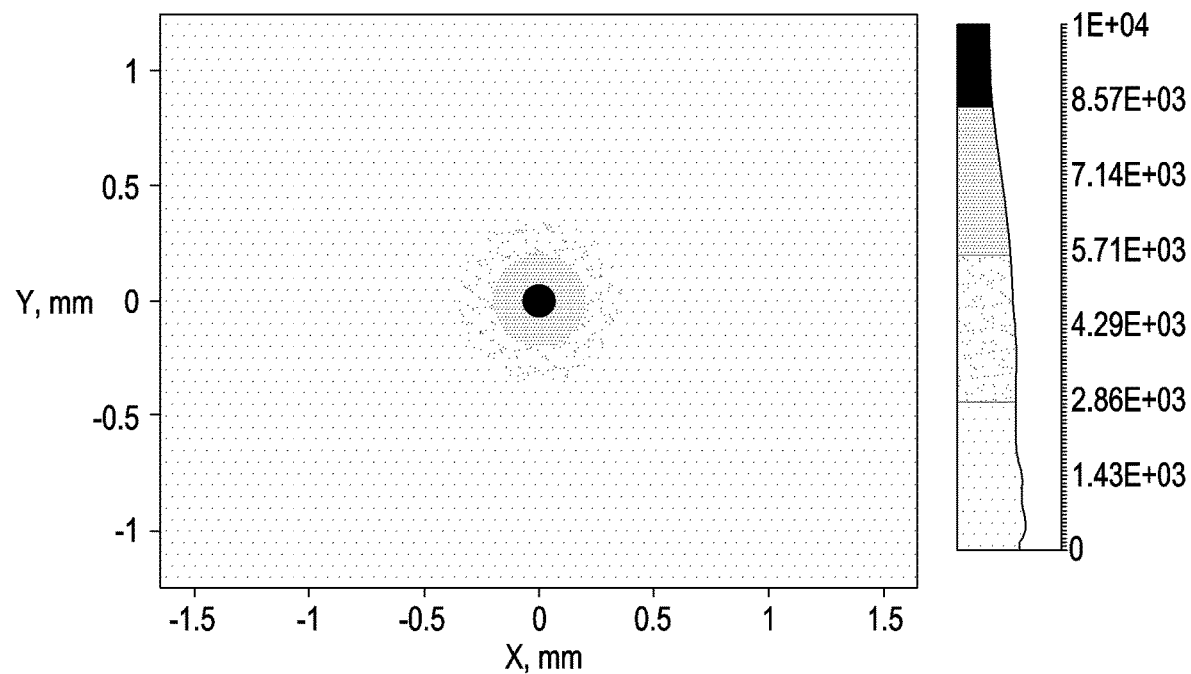
FIG. 12 is a view illustrating an example captured image in a structure in which a band pass filter is disposed closer to an image sensor than lenses, in a lens assembly according to an embodiment of the disclosure.
Figure 13:
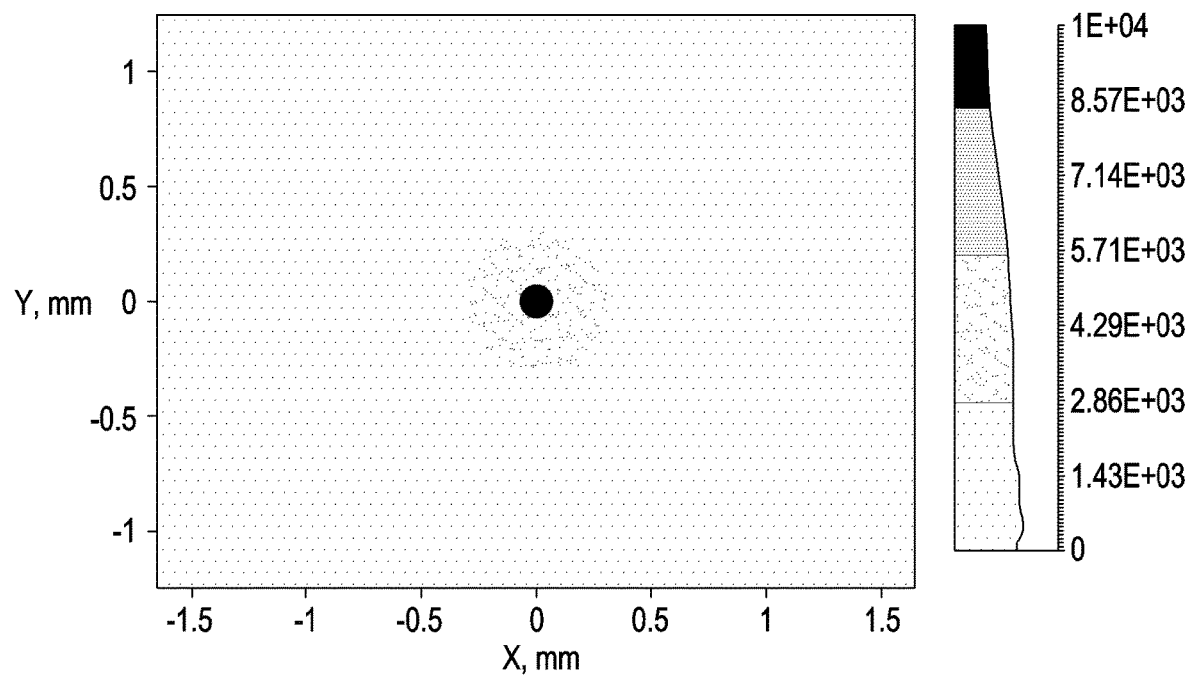
FIG. 13 is a view illustrating an example captured image in a structure in which at least one lens is disposed between a band pass filter and an image sensor in a lens assembly according to an embodiment of the disclosure.

FIG. 12 is a view illustrating an example captured image in a structure in which a band pass filter is disposed closer to an image sensor than lenses, in a lens assembly according to an embodiment of the disclosure. FIG. 13 is a view illustrating an example captured image in a structure in which at least one lens is disposed between a band pass filter BP and an image sensor (e.g., image surface img) in a lens assembly (e.g., the lens assembly of FIG. 5) according to an embodiment of the disclosure.

FIGS. 12 and 13 illustrate an image obtained by capturing the object at a distance of about 30 cm using a lens assembly having the same configuration for the lenses and the image sensor but having different positions for the band pass filter. For example, the image of FIG. 12 is an image captured through a lens assembly (hereinafter, referred to as a "comparative example") in which the band pass filter is disposed closer to the image sensor side than lenses, and the image of FIG. 13 is an image captured through a lens assembly (e.g., the lens assembly of FIG. 5) in which at least one lens is disposed between the band pass filter BP and the image sensor (e.g., the image surface img). Referring to FIGS. 12 and 13, it may be identified that the quality (e.g., sharpness) of the image captured through the lens assembly according to various embodiments of the disclosure is enhanced as compared to the comparative example. This may be implemented by blocking unnecessary light incidence by the band pass filter BP and/or infrared blocking lens and enhancing the refraction, reflection, and/or scattering by the band pass filter BP or lens(es).

TABLE 9

| surface | S9 | S10 | S11 | S12 | S13 |
|---|---|---|---|---|---|
| K(Conic) | 5.95168E+01 | −1.48352E+01 | −3.23502E+00 | −4.05703E+00 | −2.14872E+00 |
| A(4th)/C4 | 5.19649E−03 | 5.28632E−02 | −3.93203E−02 | 6.48699E−02 | −6.29775E−02 |
| B(6th)/C5 | −2.05178E−02 | −6.44085E−02 | 1.22582E−01 | −1.35537E−01 | 1.08686E−02 |
| C(8th)/C6 | 4.74240E−02 | 5.37189E−02 | −2.21442E−01 | 9.68160E−02 | −3.01729E−03 |
| D(10th)/C7 | −9.04651E−02 | −3.72059E−02 | 2.27491E−01 | −4.91802E−02 | 1.47952E−03 |
| E(12th)/C8 | 8.63012E−02 | 1.20228E−02 | −1.44289E−01 | 1.75280E−02 | −4.82327E−04 |
| F(14th)/C9 | −4.77170E−02 | 1.99423E−04 | 5.66455E−02 | −4.11725E−03 | 8.73671E−05 |
| G(16th)/C10 | 1.55017E−02 | −9.96637E−04 | −1.31543E−02 | 6.02212E−04 | −8.80940E−06 |
| H(18th)/C11 | −2.74278E−03 | 2.03744E−04 | 1.64228E−03 | −4.96012E−05 | 4.60633E−07 |
| J(20th)/C12 | 2.04108E−04 | −1.25369E−05 | −8.47056E−05 | 1.75496E−06 | −9.47100E−09 |

According to various embodiments, as compared to the comparative example, even if optical distortion slightly increases in the design of the lens assembly according to various embodiments of the disclosure, the substantial quality of the captured image may be maintained to be the same as that of the comparative example. For example, even if the design condition in optical distortion is alleviated, the lens assembly according to various embodiments of the disclosure may provide the same performance as the lens assembly of the comparative example. In an embodiment, the design freedom of the lens assembly may be enhanced by mitigating the design conditions in optical distortion. For example, it may be possible to easily secure the F number of the lens assembly and downsize the lens assembly.

Referring back to FIGS. 1 to 4, a camera module or an electronic device (e.g., the camera module 280 of FIG. 2 or the electronic device 300 of FIG. 3) including the lens assembly 400, 500, or 600 as described above is described.

According to various embodiments, the lens assembly 400, 500, or 600 as described above may be provided as the lens assembly 210 of FIG. 2. In an embodiment, a camera module (e.g., the camera module 280 of FIG. 2) including the lens assembly 400, 500, or 600 as described above may be implemented as the camera module 305, 312, or 313 of FIG. 3 or 4. In an embodiment, the camera module 305 disposed on the front surface of the electronic device 300 of FIG. 3 may include a plurality of cameras, e.g., a first camera and a second camera. In an embodiment, the first camera of the camera module 305 may include the above-described lens assembly 400, 500, or 600 and may detect distance information about the object using near-infrared rays. The second camera of the camera module 305 may be a camera for capturing a color or gray-level image. For example, the second camera may detect or obtain at least one of second information about the object, e.g., color information, brightness information, chroma information, or contrast information. In an embodiment, the processor or the image signal processor (e.g., the processor 120 of FIG. 1 or the image signal processor 260 of FIG. 2) may be configured to generate an object image by synthesizing information (e.g., information about the distance to the object) detected by the first camera and information obtained by the second camera. In an embodiment, the second camera may include multiple cameras. For example, the first camera may include a near-infrared camera, and the second camera may be a combination of a telephoto camera and a wide-angle camera.

According to various embodiments, in an environment where the design conditions for the outer diameter of the lens or the total length of the lens assembly are relatively free, the camera module (e.g., the camera module 280 of FIG. 2) including the lens assembly 400, 500, or 600 may be utilized for security purposes such as of a public place or a daily living space. For example, the lens assembly 400, 500, or 600 or the camera module 280 may be utilized for a closed-circuit television camera for security, a camera for recognizing an object in a vehicle, and a thermal imaging camera. In another embodiment, the lens assembly 400, 500, or 600 may be manufactured with a total length of about 3 mm to 6 mm. For example, the lens assembly 400, 500, or 600 may be mounted in a personal electronic device such as a mobile communication terminal to provide functions such as user authentication, object recognition, augmented reality, and a 3D scanner.

According to various embodiments, the electronic device 300 may emit light (e.g., infrared or near-infrared rays) toward the object using a light source device, and the first camera of the camera module 305 may detect first information about the object, e.g., distance information (e.g., depth information), by detecting the light emitted from the light source device and reflected by the object. In an embodiment, the light source device may include an infrared light emitting diode or a near-infrared laser light source, and the light emitting element 306 of the electronic device 300 may be utilized as the light source device. In another embodiment, the electronic device 300 may include a light source device separate from the light emitting element 306 to emit light for detecting distance information. For example, as the flash 313 of FIG. 4 may be replaced with an infrared light emitting diode or a near-infrared laser light source, and the second camera device 312 includes the lens assembly 400, 500, or 600, it is possible to detect the light, e.g., infrared or near-infrared light, emitted from the flash 313 and reflected by the object. The processor or image signal processor (e.g., the processor 120 of FIG. 1 or the image signal processor 260 of FIG. 2) may be configured to calculate the distance to the object based on the time from the emission of the infrared or near-infrared light to the detection of the infrared or near-infrared light.

According to various embodiments of the disclosure, a lens assembly (e.g., the lens assembly 210, 400, 500, or 600 of FIGS. 2, 5, 7, and/or 9) and/or an electronic device (e.g., the electronic device 101, 102, 104, or 300 of FIGS. 1, 3, and/or 4) including the same may comprise an image sensor (e.g., the image sensor 230 of FIG. 2 or the image surface img of FIGS. 5, 7, and/or 9), at least four lenses (the lenses L1, L2, L3, L4, and L5 of FIGS. 5, 7, and/or 9) sequentially arranged along an optical axis (e.g., the optical axis O of FIGS. 5, 7, and/or 9) from an object side to the image sensor side, and at least one band pass filter (e.g., the band pass filter BP of FIGS. 5, 7, and/or 9) having a transmittance of 90% to 98% for at least a portion of light in a wavelength range of 800 nm to 1000 nm. At least one of the lenses may be disposed between the band pass filter and the image sensor. For light in a wavelength range of 400 nm to 700 nm, at least one of the lenses may have a transmittance of 0% to 10%, and all of the lenses may have an average transmittance of 0% to 5%. Conditional Equation 1 below may be met:

$$0.35 = <POS/TTL = <1.2 \qquad \text{Conditional Equation 1}$$

where 'POS' is a distance from an object-side surface of a filter positioned farthest from the image sensor among the at least one band pass filter to an image surface of the image sensor, and 'TTL' is a distance from an object-side surface of a first lens (e.g., the first lens L1 of FIGS. 5, 7, and/or 9) closest to an object side among the lenses to the image surface.

According to various embodiments, the lens assembly and/or the electronic device including the same may meet Conditional Equation 2 below:

$$TTL/IH = <2.0 \qquad \text{Conditional Equation 2}$$

where 'IH' is a paraxial image height.

According to various embodiments, a lens having a transmittance of 0% to 10% for light in a wavelength range of 400 nm to 700 nm among the lenses may be disposed closer to the object side than the band pass filter.

According to various embodiments, the F number of the lens assembly may be 0.9 or more and 1.6 or less.

According to various embodiments, an object-side surface of the first lens may be convex, and an image sensor-side surface of the first lens may be formed as an aspheric surface.

According to various embodiments, at least one of an object-side surface and an image sensor-side surface of the first lens may be formed as an aspheric surface including an inflection point.

According to various embodiments, an object-side surface of a lens (e.g., the fourth lens L4 of FIGS. 5 and 7 and/or the fifth lens L5 of FIG. 9) closest to the image surface of the image sensor among the lenses may be convex, and an image sensor-side surface of a lens (e.g., the third lens L3 of FIGS. 5 and 7 and/or the fourth lens L4 of FIG. 9) second closest to the image surface of the image sensor may be convex.

According to various embodiments, the object-side surface of the first lens may be convex, and an object-side surface of a second lens among the lenses may be convex. The second lens may be disposed adjacent to the first lens and on the image sensor side of the first lens.

According to various embodiments, at least two of remaining lenses except for the first lens among the lenses may have the same refractive index for light in a wavelength range of 800 nm to 1000 nm.

According to various embodiments of the disclosure, a lens assembly (e.g., the lens assembly 210, 400, 500, or 600 of FIGS. 2, 5, 7, and/or 9) and/or an electronic device (e.g., the electronic device 101, 102, 104, or 300 of FIGS. 1, 3, and/or 4) including the same may comprise an image sensor (e.g., the image sensor 230 of FIG. 2 or the image surface img of FIGS. 5, 7, and/or 9), at least four lenses (the lenses L1, L2, L3, L4, and L5 of FIGS. 5, 7, and/or 9) sequentially arranged along an optical axis (e.g., the optical axis O of FIGS. 5, 7, and/or 9) from an object side to the image sensor side, and at least one band pass filter (e.g., the band pass filter BP of FIGS. 5, 7, and/or 9) having a transmittance of 90% to 98% for at least a portion of light in a wavelength range of 800 nm to 1000 nm. At least one of the lenses may be disposed between the band pass filter and the image sensor. For light in a wavelength range of 400 nm to 700 nm, at least one of the lenses may have a transmittance of 0% to 10%. Conditional Equations 3 and 4 below may be met:

$$0 =< Rmax =< 0.5 \quad \text{Conditional Equation 3}$$

$$0 =< Ravg =< 0.3 \quad \text{Conditional Equation 4}$$

where 'R max' is a highest value in % of reflectances of the band pass filter for light in a wavelength range of 800 nm to 1000 nm, and 'R avg' is an average in % of the reflectances of the band pass filter for the light in the wavelength range of 800 nm to 1000 nm.

According to various embodiments, the F number of the lens assembly may be 0.9 or more and 1.6 or less.

According to various embodiments, an object-side surface of the first lens may be convex, and an image sensor-side surface of the first lens may be formed as an aspheric surface.

According to various embodiments, at least one of an object-side surface and an image sensor-side surface of the first lens may be formed as an aspheric surface including an inflection point.

According to various embodiments, an object-side surface of a lens (e.g., the fourth lens L4 of FIGS. 5 and 7 and/or the fifth lens L5 of FIG. 9) closest to the image surface of the image sensor among the lenses may be convex, and an image sensor-side surface of a lens (e.g., the third lens L3 of FIGS. 5 and 7 and/or the fourth lens L4 of FIG. 9) second closest to the image surface of the image sensor may be convex.

According to various embodiments, the object-side surface of the first lens may be convex, and an object-side surface of a second lens among the lenses may be convex. The second lens may be disposed adjacent to the first lens and on the image sensor side of the first lens.

According to various embodiments, at least two of remaining lenses except for the first lens among the lenses may have the same refractive index for light in a wavelength range of 800 nm to 1000 nm.

According to various embodiments of the disclosure, an electronic device (e.g., the electronic device 101, 102, 104, or 300 of FIGS. 1, 3, and/or 4) may comprise a first camera (e.g., the camera module 180, 280, 305, or 312 of FIGS. 1 to 4) including a lens assembly (e.g., the lens assembly 210, 400, 500, or 600 of FIGS. 2, 5, 7, and/or 9) and obtaining first information about an object from light incident through the lens assembly and a processor or an image signal processor (e.g., the processor 120 or image signal processor 260 of FIG. 1) configured to detect a distance to the object using the first camera. The lens assembly may comprise an image sensor (e.g., the image sensor 230 of FIG. 2 or the image surface img of FIGS. 5, 7, and/or 9), at least four lenses (the lenses L1, L2, L3, L4, and L5 of FIGS. 5, 7, and/or 9) sequentially arranged along an optical axis (e.g., the optical axis O of FIGS. 5, 7, and/or 9) from an object side to the image sensor side, and at least one band pass filter (e.g., the band pass filter BP of FIGS. 5, 7, and/or 9) having a transmittance of 90% to 98% for at least a portion of light in a wavelength range of 800 nm to 1000 nm. At least one of the lenses may be disposed between the band pass filter and the image sensor. For light in a wavelength range of 400 nm to 700 nm, at least one of the lenses may have a transmittance of 0% to 10%, and all of the lenses may have an average transmittance of 0% to 5%. Conditional Equation 5 below may be met:

$$0.35 =< POS/TTL =< 1.2 \quad \text{Conditional Equation 5}$$

where 'POS' is a distance from an object-side surface of a filter positioned farthest from the image sensor among the at least one band pass filter to an image surface of the image sensor, and 'TTL' is a distance from an object-side surface of a first lens closest to an object side among the lenses to the image surface.

According to various embodiments, the electronic device may further comprise a light source (e.g., the light emitting element 306 of FIG. 3 or the flash 313 of FIG. 4). The processor or the image signal processor may be configured to radiate light in a wavelength range of 800 nm to 1000 nm using the light source, and wherein the first camera is configured to receive light radiated from the light source and reflected by the object.

According to various embodiments, the electronic device may further comprise at least one second camera configured to obtain information about at least one of a color, brightness, chroma, and contrast regarding the object. The processor or the image signal processor may be configured to generate an object image by synthesizing the distance information detected by the first camera and the information obtained by the second camera.

According to various embodiments, a lens having a transmittance of 0% to 10% for light in a wavelength range of 400 nm to 700 nm among the lenses may be disposed closer to the object side than the band pass filter.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A lens assembly, comprising:
an image sensor;
at least four lenses sequentially arranged along an optical axis from an object side to an image sensor side; and
at least one band pass filter having a transmittance of 90% to 98% for at least a portion of light in a wavelength range of 800 nm to 1000 nm,
wherein at least one of the lenses is disposed between the band pass filter and the image sensor,
wherein for light in a wavelength range of 400 nm to 700 nm, at least one of the lenses has a transmittance of 0% to 10%, and all of the lenses have an average transmittance of 0% to 5%, and
wherein the following conditional equation below is met:

$$0.35 =< POS/TTL =< 1.2,$$

wherein 'POS' is a distance from an object-side surface of a filter positioned farthest from the image sensor among the at least one band pass filter to an image surface of the image sensor, and
wherein 'TTL' is a distance from an object-side surface of a first lens closest to an object side among the lenses to the image surface.

2. The lens assembly of claim 1,
wherein the lens assembly meets the following conditional equation below:

$$TTL/IH =< 2.0,$$

wherein 'IH' is a paraxial image height.

3. The lens assembly of claim 1, wherein a lens having a transmittance of 0% to 10% for light in a wavelength range of 400 nm to 700 nm among the lenses is disposed closer to the object side than the band pass filter.

4. The lens assembly of claim 1, wherein F number is 0.9 or more and 1.6 or less.

5. The lens assembly of claim 1,
wherein an object-side surface of the first lens is convex, and
wherein an image sensor-side surface of the first lens is formed as an aspheric surface.

6. The lens assembly of claim 1, wherein at least one of an object-side surface and an image sensor-side surface of the first lens is formed as an aspheric surface including an inflection point.

7. The lens assembly of claim 1,
wherein an object-side surface of a lens closest to the image surface of the image sensor among the lenses is convex, and
wherein an image sensor-side surface of a lens second closest to the image surface of the image sensor is convex.

8. The lens assembly of claim 1,
wherein the object-side surface of the first lens is convex, and an object-side surface of a second lens among the lenses is convex, and
wherein the second lens is disposed adjacent to the first lens and on the side with the image sensor of the first lens.

9. The lens assembly of claim 1, wherein at least two of remaining lenses except for the first lens among the lenses have the same refractive index for light in a wavelength range of 800 nm to 1000 nm.

10. The lens assembly of claim 1,
wherein the lens assembly meets the following conditional equations below:

$$0 =< Rmax =< 0.5; \text{ and}$$

$$0 =< Ravg =< 0.3,$$

wherein 'R max' is a highest value in % of reflectances of the band pass filter for light in a wavelength range of 800 nm to 1000 nm, and
wherein 'R avg' is an average in % of the reflectances of the band pass filter for the light in the wavelength range of 800 nm to 1000 nm.

11. The lens assembly of claim 10, wherein F number is 0.9 or more and 1.6 or less.

12. The lens assembly of claim 10, wherein at least two of remaining lenses except for the first lens among the lenses have the same refractive index for light in a wavelength range of 800 nm to 1000 nm.

13. An electronic device, comprising:
a first camera including a lens assembly comprising:
an image sensor;
at least four lenses sequentially arranged along an optical axis from an object side to an image sensor side; and
at least one band pass filter having a transmittance of 90% to 98% for at least a portion of light in a wavelength range of 800 nm to 1000 nm,
wherein at least one of the lenses is disposed between the band pass filter and the image sensor,
wherein for light in a wavelength range of 400 nm to 700 nm, at least one of the lenses has a transmittance of 0% to 10%, and all of the lenses have an average transmittance of 0% to 5%, and
wherein the following conditional equation below is met:

$$0.35 =< POS/TTL =< 1.2,$$

wherein 'POS' is a distance from an object-side surface of a filter positioned farthest from the image sensor among the at least one band pass filter to an image surface of the image sensor,
wherein 'TTL' is a distance from an object-side surface of a first lens closest to an object side among the lenses to the image surface, and
wherein the first camera is configured to obtain first information about an object from light incident through the lens assembly; and
a processor or an image signal processor configured to detect a distance to the object using the first camera.

14. The electronic device of claim 13, further comprising:
a light source,
wherein the processor or the image signal processor is configured to radiate light in a wavelength range of 800 nm to 1000 nm using the light source, and
wherein the first camera is configured to receive light radiated from the light source and reflected by the object.

15. The electronic device of claim 13, further comprising:
at least one second camera configured to obtain information about at least one of a color, brightness, chroma, and contrast regarding the object,
wherein the processor or the image signal processor is configured to generate an object image by synthesizing distance information detected by the first camera and the information obtained by the second camera.

* * * * *